(12) United States Patent
Fuji et al.

(10) Patent No.: US 10,331,674 B2
(45) Date of Patent: Jun. 25, 2019

(54) INFORMATION PROCESSING METHOD, INFORMATION PROCESSING APPARATUS AND STORAGE MEDIUM TO DETERMINE RANKING OF REGISTRANTS

(71) Applicant: FUJITSU LIMITED, Kawasaki-shi, Kanagawa (JP)

(72) Inventors: Masaru Fuji, Musashino (JP); Tomoki Nagase, Kawasaki (JP); Yuchang Cheng, Kawasaki (JP); Masataka Kadotani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 550 days.

(21) Appl. No.: 14/800,011

(22) Filed: Jul. 15, 2015

(65) Prior Publication Data

US 2016/0055249 A1 Feb. 25, 2016

(30) Foreign Application Priority Data

Aug. 21, 2014 (JP) .................................. 2014-168309

(51) Int. Cl.
    *G06Q 10/10* (2012.01)
    *G06F 16/335* (2019.01)
    *G06F 16/2457* (2019.01)

(52) U.S. Cl.
    CPC ...... *G06F 16/24575* (2019.01); *G06F 16/335* (2019.01); *G06Q 10/10* (2013.01)

(58) Field of Classification Search
    CPC ........ G06F 17/30528; G06F 17/30699; G06Q 10/10

(Continued)

(56) References Cited

U.S. PATENT DOCUMENTS

2009/0319518 A1* 12/2009 Koudas ............. G06F 17/30696
    707/999.005
2011/0313987 A1* 12/2011 Ghosh ............... G06F 17/30675
    707/706

(Continued)

FOREIGN PATENT DOCUMENTS

| JP | 2006-268080 | 10/2006 |
|----|-------------|---------|
| JP | 2008-234550 | 10/2008 |

(Continued)

*Primary Examiner* — Pierre M Vital
*Assistant Examiner* — Alicia M Antoine
(74) *Attorney, Agent, or Firm* — Staas & Halsey LLP

(57) ABSTRACT

An information processing method executed by an information processing apparatus, includes receiving a keyword; extracting one or more experts related to a document including the keyword from document information, the document information including a plurality of documents registered within a period of time including a plurality of periods and information on an expert related to each of the plurality of documents; determining a score in each period based on a ratio of a number of registered documents related to the keyword to a number of all registered documents and a coefficient increased in value as the period becomes newer, with respect to each of the one or more experts; determining an expert value related to the keyword for each of the one or more experts by adding together the score in each period; and ranking each of the one or more experts based on comparison of the expert value.

11 Claims, 25 Drawing Sheets

(58) Field of Classification Search
 USPC .......................................................... 707/725
 See application file for complete search history.

(56) References Cited

U.S. PATENT DOCUMENTS

| | | | | |
|---|---|---|---|---|
| 2012/0117059 A1* | 5/2012 | Bailey | ................ | G06F 17/30867 |
| | | | | 707/723 |
| 2012/0310928 A1* | 12/2012 | Ray | ................... | G06F 17/30979 |
| | | | | 707/728 |
| 2013/0066866 A1* | 3/2013 | Chan | ................. | G06F 17/30699 |
| | | | | 707/732 |
| 2013/0179428 A1* | 7/2013 | Archambault | .... | G06F 17/30864 |
| | | | | 707/711 |
| 2013/0325779 A1* | 12/2013 | Shahshahani | ............ | G06N 5/02 |
| | | | | 706/46 |
| 2014/0181098 A1* | 6/2014 | Bhandari | .......... | G06F 17/30722 |
| | | | | 707/728 |
| 2015/0169563 A1* | 6/2015 | Chen | ................ | G06F 17/30011 |
| | | | | 707/730 |
| 2015/0193520 A1* | 7/2015 | Lee | ........................ | G06Q 10/10 |
| | | | | 707/751 |

FOREIGN PATENT DOCUMENTS

JP         2011-103059         5/2011
WO      WO 2014201570 A1 * 12/2014   ............. G06F 17/27

* cited by examiner

FIG. 5

| No. | REGISTRANT | DATE OF REGISTRATION | NAME OF DOCUMENT |
|---|---|---|---|
| ⋮ | ⋮ | ⋮ | ⋮ |
| 4332 | NAKAMURA | 2013/02/14 | CLOUD BACKUP SERVICE |
| ⋮ | ⋮ | ⋮ | ⋮ |
| 4506 | HASHIMOTO | 2013/06/01 | CASES OF CLOUD INTRODUCTION |
| ⋮ | ⋮ | ⋮ | ⋮ |
| 4866 | SUZUKI | 2013/09/05 | ROAD MAPS OF CLOUD SERVICE PRODUCTS |
| 4867 | SUZUKI | 2013/09/06 | PROBLEMS IN CLOUD APPLICATIONS |
| ⋮ | ⋮ | ⋮ | ⋮ |
| 5022 | INOUE | 2013/11/08 | LIST OF CLOUD SERVERS FOR ENTERPRISES |
| ⋮ | ⋮ | ⋮ | ⋮ |
| 5145 | SUZUKI | 2013/12/23 | TRENDS IN CLOUD COMPUTING |

FIG. 10

| YEAR | $\gamma$ |
|---|---|
| 2006 | 0.769 |
| 2007 | 0.780 |
| 2008 | 0.794 |
| 2009 | 0.811 |
| 2010 | 0.833 |
| 2011 | 0.863 |
| 2012 | 0.909 |
| 2013 | 1.000 |

FIG. 12

| NAME OF REGISTRANT | PERIOD | KW FREQUENCY | TOTAL FREQUENCY | α | β | γ | SCORE α × β × γ | EXPERT VALUE |
|---|---|---|---|---|---|---|---|---|
| SUZUKI | 2006 | 1 | 23 | 1.000 | 0.083 | 0.769 | 0.064 | 6.57 |
| | 2007 | 0 | 18 | 0.000 | 0.000 | 0.780 | 0.000 | |
| | 2008 | 1 | 24 | 1.000 | 0.080 | 0.794 | 0.064 | |
| | 2009 | 1 | 21 | 1.000 | 0.091 | 0.811 | 0.074 | |
| | 2010 | 0 | 23 | 0.000 | 0.000 | 0.833 | 0.000 | |
| | 2011 | 8 | 20 | 3.170 | 0.429 | 0.863 | 1.172 | |
| | 2012 | 15 | 22 | 4.000 | 0.696 | 0.909 | 2.529 | |
| | 2013 | 16 | 25 | 4.087 | 0.654 | 1.000 | 2.673 | |
| HASHIMOTO | 2006 | 9 | 10 | 3.322 | 0.909 | 0.769 | 2.321 | 9.47 |
| | 2007 | 8 | 9 | 3.170 | 0.900 | 0.780 | 2.226 | |
| | 2008 | 7 | 8 | 3.000 | 0.889 | 0.794 | 2.117 | |
| | 2009 | 7 | 8 | 3.000 | 0.889 | 0.811 | 2.163 | |
| | 2010 | 2 | 9 | 1.585 | 0.300 | 0.833 | 0.396 | |
| | 2011 | 1 | 6 | 1.000 | 0.286 | 0.863 | 0.247 | |
| | 2012 | 0 | 9 | 0.000 | 0.000 | 0.909 | 0.000 | |
| | 2013 | 0 | 4 | 0.000 | 0.000 | 1.000 | 0.000 | |
| NAKAMURA | 2006 | 5 | 6 | 2.585 | 0.857 | 0.769 | 1.703 | 13.49 |
| | 2007 | 4 | 4 | 2.322 | 1.000 | 0.780 | 1.812 | |
| | 2008 | 5 | 7 | 2.585 | 0.750 | 0.794 | 1.539 | |
| | 2009 | 3 | 3 | 2.000 | 1.000 | 0.811 | 1.622 | |
| | 2010 | 4 | 5 | 2.322 | 0.833 | 0.833 | 1.612 | |
| | 2011 | 3 | 5 | 2.000 | 0.667 | 0.863 | 1.150 | |
| | 2012 | 4 | 4 | 2.322 | 1.000 | 0.909 | 2.110 | |
| | 2013 | 5 | 7 | 2.585 | 0.750 | 1.000 | 1.939 | |
| INOUE | 2006 | 0 | 0 | 0.000 | 0.000 | 0.769 | 0.000 | 9.61 |
| | 2007 | 0 | 0 | 0.000 | 0.000 | 0.780 | 0.000 | |
| | 2008 | 0 | 0 | 0.000 | 0.000 | 0.794 | 0.000 | |
| | 2009 | 2 | 2 | 1.585 | 1.000 | 0.811 | 1.285 | |
| | 2010 | 4 | 4 | 2.322 | 1.000 | 0.833 | 1.934 | |
| | 2011 | 3 | 4 | 2.000 | 0.800 | 0.863 | 1.380 | |
| | 2012 | 6 | 6 | 2.807 | 1.000 | 0.909 | 2.551 | |
| | 2013 | 6 | 7 | 2.807 | 0.875 | 1.000 | 2.456 | |

FIG. 14

| NAME | FUNCTION OR JOB DESCRIPTION | NUMBER OF DOCUMENTS INCLUDING SEARCH KEYWORD | |
|---|---|---|---|
| SUZUKI | FIELD MANAGER | 42 | WITHIN RANGE OF SCREEN DISPLAY |
| WATANABE | FIELD MANAGER | 41 | |
| YAMADA | FIELD MANAGER | 40 | |
| ⋮ | ⋮ | ⋮ | |
| HASHIMOTO | FIELD PERSON IN CHARGE | 35 | |
| NAKAMURA | FIELD PERSON IN CHARGE | 33 | OUTSIDE RANGE OF SCREEN DISPLAY |
| INOUE | FIELD PERSON IN CHARGE | 21 | |
| ... | ... | ... | |

FIG. 15

| NAME | FUNCTION OR JOB DESCRIPTION | NUMBER OF DOCUMENTS INCLUDING SEARCH KEYWORD | |
|---|---|---|---|
| NAKAMURA | FIELD PERSON IN CHARGE | 13.49 | WITHIN RANGE OF SCREEN DISPLAY |
| INOUE | FIELD PERSON IN CHARGE | 9.61 | |
| HASHIMOTO | FIELD PERSON IN CHARGE | 9.47 | |
| ⋮ | ⋮ | ⋮ | |
| SUZUKI | FIELD MANAGER | 6.57 | OUTSIDE RANGE OF SCREEN DISPLAY |
| WATANABE | FIELD MANAGER | ... | |
| TANAKA | FIELD MANAGER | ... | |
| ... | ... | ... | |

INFORMATION PROCESSING METHOD, INFORMATION PROCESSING APPARATUS AND STORAGE MEDIUM TO DETERMINE RANKING OF REGISTRANTS

CROSS-REFERENCE TO RELATED APPLICATION

This application is based upon and claims the benefit of priority from the prior Japanese Patent Application No. 2014-168309 filed on Aug. 21, 2014, the entire contents of which are incorporated herein by reference.

FIELD

The present technology relates to an information processing method, an information processing apparatus, and a storage medium.

BACKGROUND

In an organization such as a company, a university, a government agency or a research institution, various experts are performing work activities using a same network. When launching a new project, for example, in the organization, it is desirable to be able to efficiently gather experts having expertise that may be necessary to carry out the project from among the experts distributed within the organization.

Accordingly, in recent years, technologies have been disclosed which enable an easy search to be made for experts via a network. Patent Document 1, for example, discloses a technology that, when receiving a search request specifying a search keyword from a user terminal, retrieves a document including the search keyword within the document from a document storage apparatus. According to the technology, the importance score of the search keyword within the retrieved document is determined. Then, the expert degree score of a registrant of the retrieved document is calculated on the basis of the registrant of the retrieved document and the importance score. Registered users can be ranked on the basis of expert degree scores by the above-described method. Japanese Laid-open Patent Publication No. 2008-234550, Japanese Laid-open Patent Publication No. 2006-268080, and Japanese Laid-open Patent Publication No. 2011-103059, for example, are disclosed as related art.

According to the method disclosed in Japanese Laid-open Patent Publication No. 2008-234550, a person who has registered a larger number of documents including a search keyword is determined to have a higher level of expertise. Further, even a person who is not engaged in work related to the search keyword now is determined to be a person having a high level of expertise depending on the number of documents including the search keyword which documents were registered in the past. In view of these problems, it is desirable to be able to further improve the accuracy of searching for experts on the basis of a search keyword.

SUMMARY

According to an aspect of the embodiment, an information processing method executed by an information processing apparatus, the information processing method includes receiving a keyword; extracting one or more experts related to a document including the keyword from document information, the document information including a plurality of documents registered within a period of time including a plurality of periods and information on an expert related to each of the plurality of documents; determining a score in each period based on a ratio of a number of registered documents related to the keyword to a number of all registered documents and a coefficient increased in value as the period becomes newer, with respect to each of the one or more experts; determining an expert value related to the keyword for each of the one or more experts by adding together the score in each period; and ranking each of the one or more experts based on comparison of the expert value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a document database;

FIG. 10 is a diagram illustrating an example of a parameter $\gamma$ set for each period based on Equation (3);

FIG. 12 is a diagram illustrating an example of a result of calculating scores and expert values;

FIG. 14 is a diagram illustrating an example of a result of ranking experts based on numbers of documents including a search keyword;

FIG. 15 is a diagram illustrating an example of a result of ranking experts which result is generated based on expert values;

FIG. 17 is a flowchart illustrating an example of processing of extracting a keyword containing document in S102a;

DESCRIPTION OF EMBODIMENTS

Embodiments of the present technology will hereinafter be described concretely with reference to FIGS. 1 to 25.

[First Embodiment]

Figure 1:
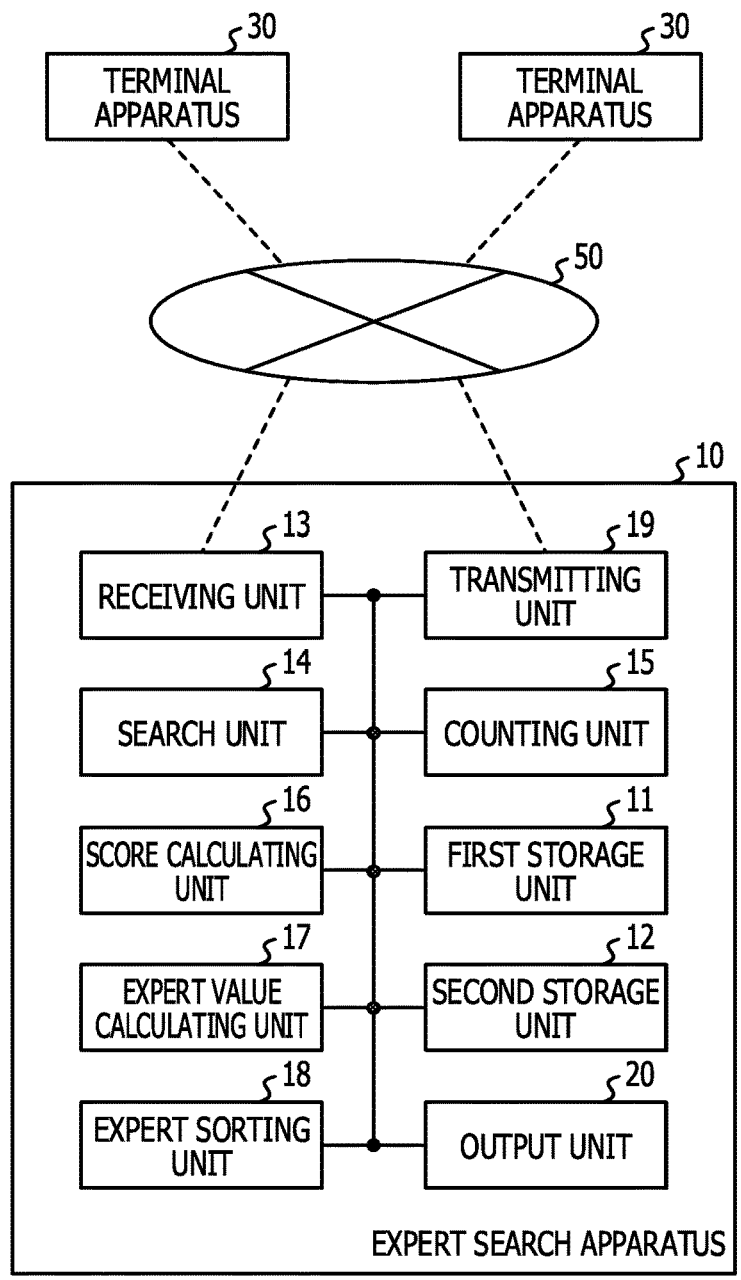
FIG. 1 is a diagram illustrating an example of a configuration of an expert search system.

FIG. 1 is a diagram illustrating an example of a configuration of an expert search system. As illustrated in FIG. 1, the expert search system includes an expert search apparatus 10 and terminal apparatuses 30. The expert search apparatus 10 and the terminal apparatuses 30 are communicatively coupled to each other via a network 50 such as the Internet.

The expert search apparatus 10 is an information processing apparatus configured to search for experts in a particular field using a document database (document DB) in which documents are registered. Here, experts are human resources having knowledge and skills in a specialized field, and are human resources capable of exerting power in launching and carrying out a project in a specialized field in an organization such as a company, a university, a government agency or a research institution. For example, constituent members of a company include field persons in charge who are directly engaged in work in a specialized field and a field manager managing the work in the field. The expert search apparatus 10 in the present embodiment can extract both of the field persons in charge and the field manager by searching the document DB on the basis of a search keyword. The document DB is an example of document information. The expert search apparatus 10 is for example implemented by a server, a general-purpose computer or a personal computer (PC). A method of processing performed by the expert search apparatus 10 will be described later.

The terminal apparatuses 30 are for example terminals owned by users using the expert search apparatus 10 to search for experts. The terminal apparatuses 30 are for example smart phones, mobile telephones, notebook PCs, desktop PCs or tablet terminals. The documents are for example text information such as materials, papers and email documents, image information including still images such as photographs and moving images, or sound information.

A hardware configuration of the expert search apparatus 10 will next be described.

Figure 2:
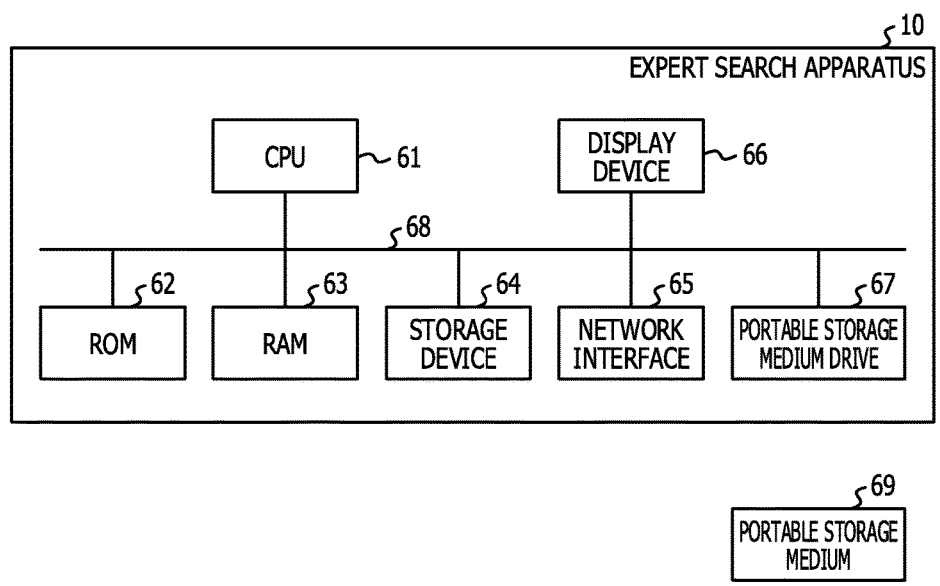
FIG. 2 is a diagram illustrating an example of a hardware configuration of an expert search apparatus.

FIG. 2 is a diagram illustrating an example of a hardware configuration of an expert search apparatus. The expert search apparatus depicted in FIG. 2 may be the expert search apparatus 10 depicted in FIG. 1. As illustrated in FIG. 2, the expert search apparatus 10 includes a central processing unit (CPU) 61, a read only memory (ROM) 62, a random access memory (RAM) 63, a storage device 64, a network interface 65, a display device 66, a portable storage medium drive 67, and the like.

The constituent parts of the expert search apparatus 10 are coupled to a bus 68. The storage device 64 is for example a hard disk drive (HDD). In the expert search apparatus 10, a processor such as the CPU 61 executes a program (including an expert search program) stored in the ROM 62 or the storage device 64 or a program (including an expert search program) that the portable storage medium drive 67 reads from a portable storage medium 69, whereby the functions of the expert search apparatus 10 are implemented. The program may be loaded into the RAM 63, and executed by the processor such as the CPU 61. The display device 66 is for example a liquid crystal display, a plasma display, an organic electroluminescence (EL) display or an electronic paper.

Returning to FIG. 1, the functions of each part constituting the expert search apparatus 10 will be described.

As illustrated in FIG. 1, the expert search apparatus 10 includes a first storage unit 11, a second storage unit 12, a receiving unit 13, a search unit 14, a counting unit 15, a score calculating unit 16, an expert value calculating unit 17, an expert sorting unit 18, a transmitting unit 19, and an output unit 20.

The first storage unit 11 can store an expert search program for searching for experts in a particular field using the document DB. The first storage unit 11 corresponds to for example the ROM 62, the storage device 64, the portable storage medium drive 67, or the portable storage medium 69 in FIG. 2.

The second storage unit 12 is used as a database (DB) configured to store various kinds of information used for each piece of processing performed within the expert search apparatus 10. The document DB, for example, is stored in the second storage unit 12. The second storage unit 12 corresponds to for example the ROM 62, the RAM 63, the storage device 64, the portable storage medium drive 67, or the portable storage medium 69 in FIG. 2.

The receiving unit 13 receives a search keyword including the information of a character string transmitted from a terminal apparatus 30. The receiving unit 13 is mutually communicatively coupled to the terminal apparatuses 30. The receiving unit 13 is implemented by the network interface 65 in FIG. 2, for example.

The search unit 14 searches the document DB stored in the second storage unit 12 using the search keyword received by the receiving unit 13. By searching the document DB, the search unit 14 can extract all documents including the search keyword. The search unit 14 can extract a registrant who registered each of the extracted documents from all of the extracted documents. The following description of the present embodiment assumes that the registrants are identical with persons responsible for the documents and that the persons responsible for the documents include writers of the documents.

The counting unit 15 can count, for each of the registrants extracted by the search unit 14, the number of all of the documents registered by the registrant in each period. The counting unit 15 can count, for each of the registrants extracted by the search unit 14, the number of documents registered by the registrant and related to the search keyword in each period.

Figure 3:
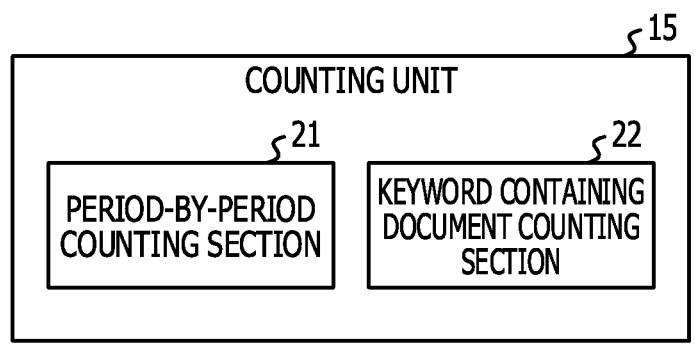
FIG. 3 is a diagram illustrating an example of a configuration of a counting unit in a first embodiment.

FIG. 3 is a diagram illustrating an example of a configuration of a counting unit in the first embodiment. The counting unit depicted in FIG. 3 may be the counting unit 15 depicted in FIG. 1. As illustrated in FIG. 3, the counting unit 15 includes a period-by-period counting section 21 and a keyword containing document counting section 22. The period-by-period counting section 21 has a function of counting the number of documents registered by a certain registrant in each period. On the other hand, the keyword containing document counting section 22 has a function of counting the number of documents including the search keyword in each period. Details of processing performed by the period-by-period counting section 21 and the keyword containing document counting section 22 will be described later. The documents including the search keyword will hereinafter be referred to as keyword containing documents.

The score calculating unit 16 calculates a score for each period, the score for each period being used to calculate an expert value on the basis of information on the number of all of the documents registered by a registrant, information on the number of documents registered by the registrant and including the search keyword, and a coefficient whose value is increased as the period becomes newer. Here, the expert value is an index indicating a level of expertise in a particular field, and is a value calculated for each registrant. A method of calculating the score will be described later. The score calculating unit 16 is implemented by a processor such as the CPU 61 in FIG. 2 or a microprocessor unit (MPU), for example.

The expert value calculating unit 17 calculates, for each registrant, the expert value related to the search keyword by adding together the scores calculated for each period by the score calculating unit 16. A method of calculating the expert value will be described later. The expert value calculating unit 17 is implemented by a processor such as the CPU 61 in FIG. 2 or an MPU, for example.

The expert sorting unit 18 ranks the registrants by sorting the expert values calculated by the score calculating unit 16. The expert sorting unit 18 then generates a list indicating a ranking result as a result of the ranking of the experts. The expert sorting unit 18 is implemented by a processor such as the CPU 61 in FIG. 2 or an MPU, for example.

The transmitting unit 19 has a function of transmitting the expert search result generated by the expert sorting unit 18 to the network 50. The terminal apparatus 30 receives, as the search result, the list transmitted from the expert search apparatus 10 via the network 50.

The output unit 20 is a hardware device corresponding to the display device 66 in FIG. 2. The output unit 20 can output the list of the experts which list is generated by the expert sorting unit 18.

Description will next be made of an information processing method executed by the expert search apparatus 10.

Figure 4:
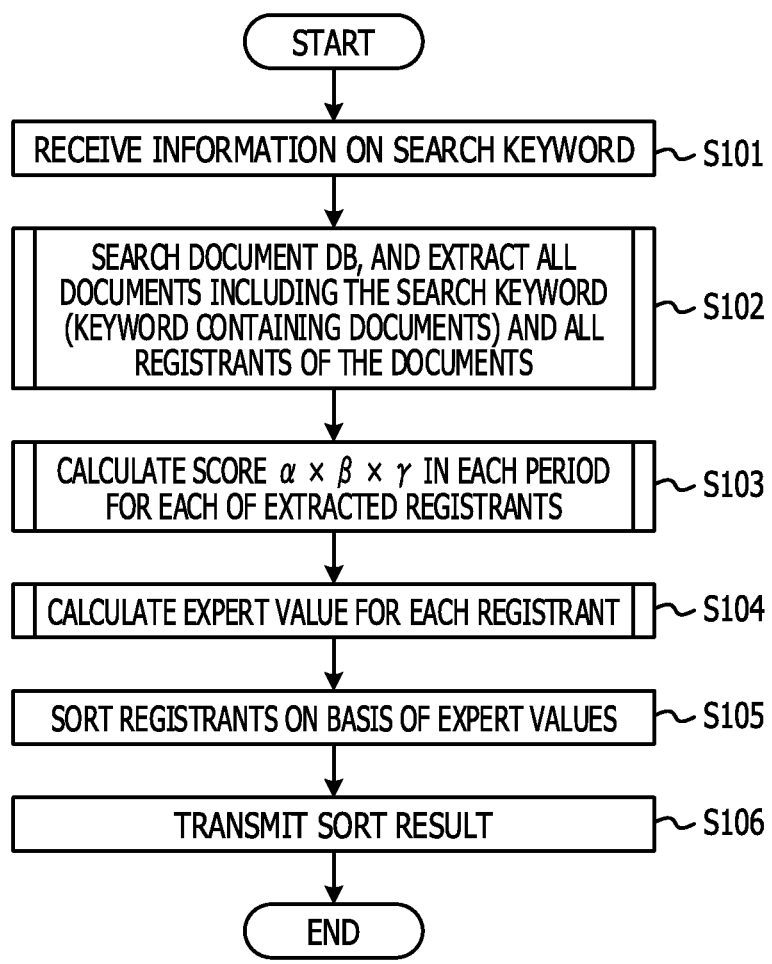
FIG. 4 is a flowchart illustrating an example of an expert search method by an expert search apparatus in the first embodiment.

FIG. 4 is a flowchart of an example of an expert search method by an expert search apparatus in the first embodiment.

First, the receiving unit 13 receives information on a search keyword input by a terminal apparatus 30 (S101). The search keyword is a keyword related to the specialized field of an expert that a user of the terminal apparatus 30 intends to search for. For example, when the user searches for an expert in cloud computing, the user inputs a word such as "cloud" or words "cloud computing," for example, to the terminal apparatus 30. The receiving unit 13 then receives these words as the search keyword.

Next, the search unit 14 searches the document DB stored in the second storage unit 12 using the search keyword, and extracts all documents including the search keyword and all registrants of the documents (S102). When a result of searching the document DB indicates that there is no document including the search keyword in the document DB, the processing of searching for an expert is ended.

FIG. 5 is a diagram illustrating an example of a document DB. As illustrated in FIG. 5, a number (No.) for uniquely identifying a document, a registrant who registered the document, a date of registration, and the name of the document are registered in the document DB in association with each other. A period to which the document corresponds can be identified on the basis of the information stored in the field of the date of registration in the document DB. For example, a document having No. 5145 has a date of registration of Dec. 23, 2013 according to the field of the date of registration (denoted as 2013/12/23 in FIG. 5). Hence, the corresponding period can be identified as the year 2013.

Details of the processing of S102 will be described in the following.

Figure 6:
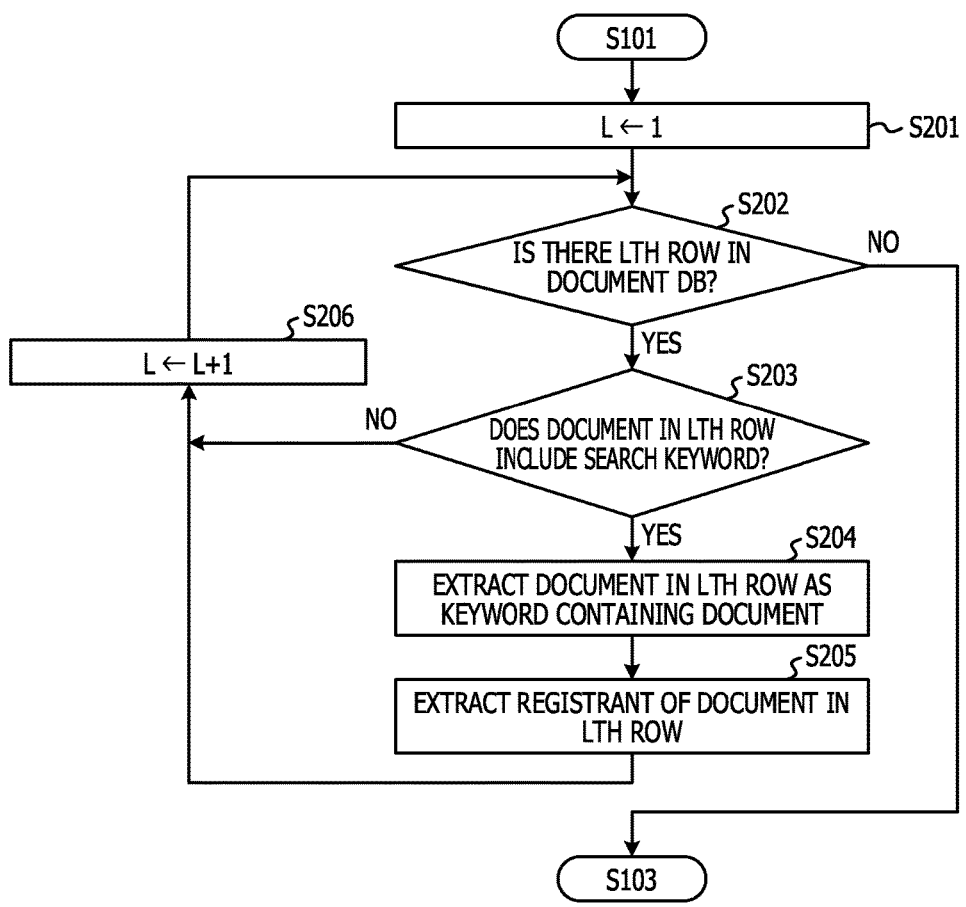
FIG. 6 is a flowchart illustrating an example of processing of extracting a keyword containing document and a registrant in S102.

FIG. 6 is a flowchart illustrating an example of processing of extracting a keyword containing document and a registrant in S102. In S102, processing is performed which sequentially searches for keyword containing documents and registrants of the keyword containing documents from a first row of the document DB.

First, in order to search from the first row of the document DB, the search unit 14 initializes the value of L, and stores 1 in L (S201).

Next, the search unit 14 searches the document DB to determine whether or not there is an Lth row in the document DB (S202). When there is no Lth row in the document DB (negative in S202), the search unit 14 determines that searches for all rows of the document DB are ended, and proceeds to S103. When there is an Lth row in the document DB (affirmative in S202), on the other hand, the search unit 14 refers to a document registered in the Lth row of the document DB, and determines whether or not the search keyword is included in the document (S203). In S203, the search unit 14 refers to the document (document file) stored in the second storage unit 12 in association with the number for uniquely identifying the document in the document DB, and searches for the search keyword in the document. The search unit 14 may refer to the name of the document which name is registered in the entry of the name of the document in the document DB rather than referring to the document file, and search for the search keyword in the name of the document.

When the document in the Lth row does not include the search keyword (negative in S203), the search unit 14 determines that the document in the Lth row of the document DB does not include the search keyword. Then, to search for a next row in the document DB, the search unit 14 increments the value of L, and thereby sets a value obtained by adding 1 to L as a new value of L (S206). After the processing of S206, the search unit 14 returns to S202 to perform the processing from S202 on down again.

When the document in the Lth row includes the search keyword (affirmative in S203), on the other hand, the search unit 14 extracts the document in the Lth row as a keyword containing document (S204). The search unit 14 then extracts the registrant of the document in the Lth row (S205). The search unit 14 thereafter performs the processing of S206 in which the value of L is incremented, and then returns to S202. Then, to search for a new Lth row in the document DB, the search unit 14 performs the processing from S202 on down again.

When searches for all rows of the document DB are eventually ended, a negative determination is made in S202, and the processing proceeds to S103. The processing of S102 is thereby completed.

An example of a result of the processing in S102 will be described with reference to FIG. 5. Suppose for example that the receiving unit 13 has received "cloud" as the search keyword. The search unit 14 searches the document DB in FIG. 5 on the basis of the "cloud" received as the search keyword. As a result, documents having document Nos. 4332, 4506, 4866, 4867, 5022, and 5145 are sequentially extracted from the documents registered in the document DB.

Then, in the case where the above-described documents are extracted, after each piece of processing illustrated in FIG. 6 is performed, the following are extracted: "Suzuki" as a registrant who registered the documents having document Nos. 4866, 4867, and 5145; "Inoue" as a registrant who registered the document having document No. 5022; "Hashimoto" as a registrant who registered the document having document No. 4506; and "Nakamura" as a registrant who registered the document having document No. 4332.

As described above, the search unit 14 can extract all of the documents including the search keyword and all of the registrants of the documents from the document DB.

The following processing will be described with a period regarded as synonymous with a "year." On the other hand, a period can also be defined by another method in which the first half and second half of one year are each defined as one period, or a plurality of years are defined collectively as one period, for example.

Returning to FIG. 4, the score calculating unit 16 calculates a score in each period for each of the extracted registrants (S103). The following description will be made of details of the processing of S103.

Figure 7:
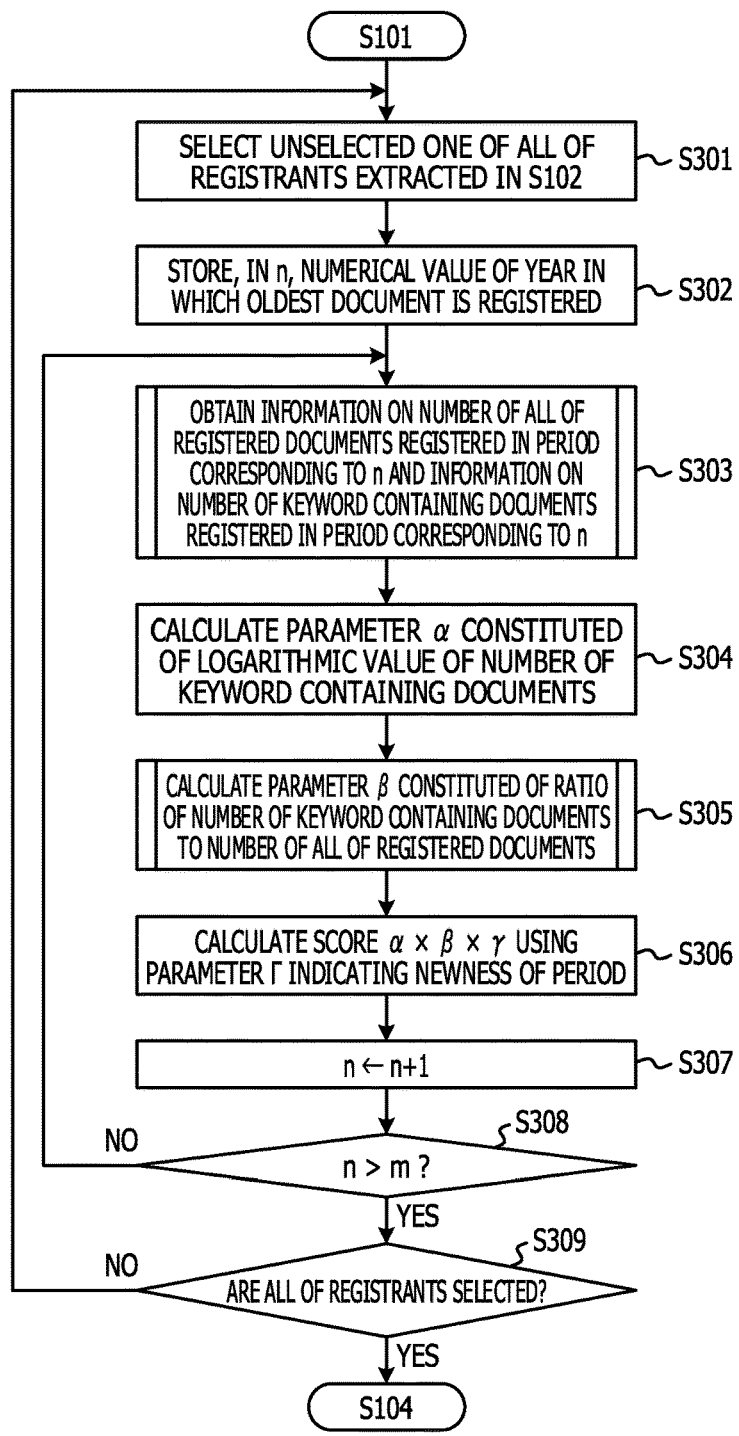
FIG. 7 is a flowchart illustrating an example of processing of calculating a score in S103.

FIG. 7 is a flowchart illustrating an example of processing of calculating a score in S103.

In S103, the score calculating unit 16 first selects an unselected one of all of the registrants extracted in S102 (S301).

Next, the score calculating unit 16 stores, in a variable n, the numerical value of a year in which an oldest document is registered among the documents stored in the document DB (S302). Here, the variable n is a variable indicating a period for the processing of calculating a score. For example, 2006 is a period ID corresponding to A.D. 2006. In the present embodiment, the period ID of A.D. X is defined as X. In a case where numbers in the document DB are given in order from the oldest document, that is, in a case where rows in the document DB are in order of registration, the year in which the oldest document is registered can be identified from the date of registration of the document in the first row of the document DB. In a case where numbers in the document DB are not given in order from the oldest document, on the other hand, because searches are made for all rows of the document DB in the processing of S102 illustrated in FIG. 6, the year in which the oldest document is registered can be identified on the basis of the document having the oldest date of registration in all of the searched-for rows when the searches are ended.

After the processing of S302, the score calculating unit 16 refers to the document DB, and obtains information on the number of all of the registered documents registered in the period corresponding to n and information on the number of keyword containing documents registered in the period corresponding to n with respect to the registrant selected in S301 (S303). All of the registered documents registered in a certain period will hereinafter be referred to as all of the registered documents. When n=2006, for example, the score calculating unit 16 obtains information on the number of all of the registered documents in 2006 and information on the number of keyword containing documents in 2006 with respect to the registrant selected in S301.

Details of the processing of S303 will be described in the following.

Figure 8:
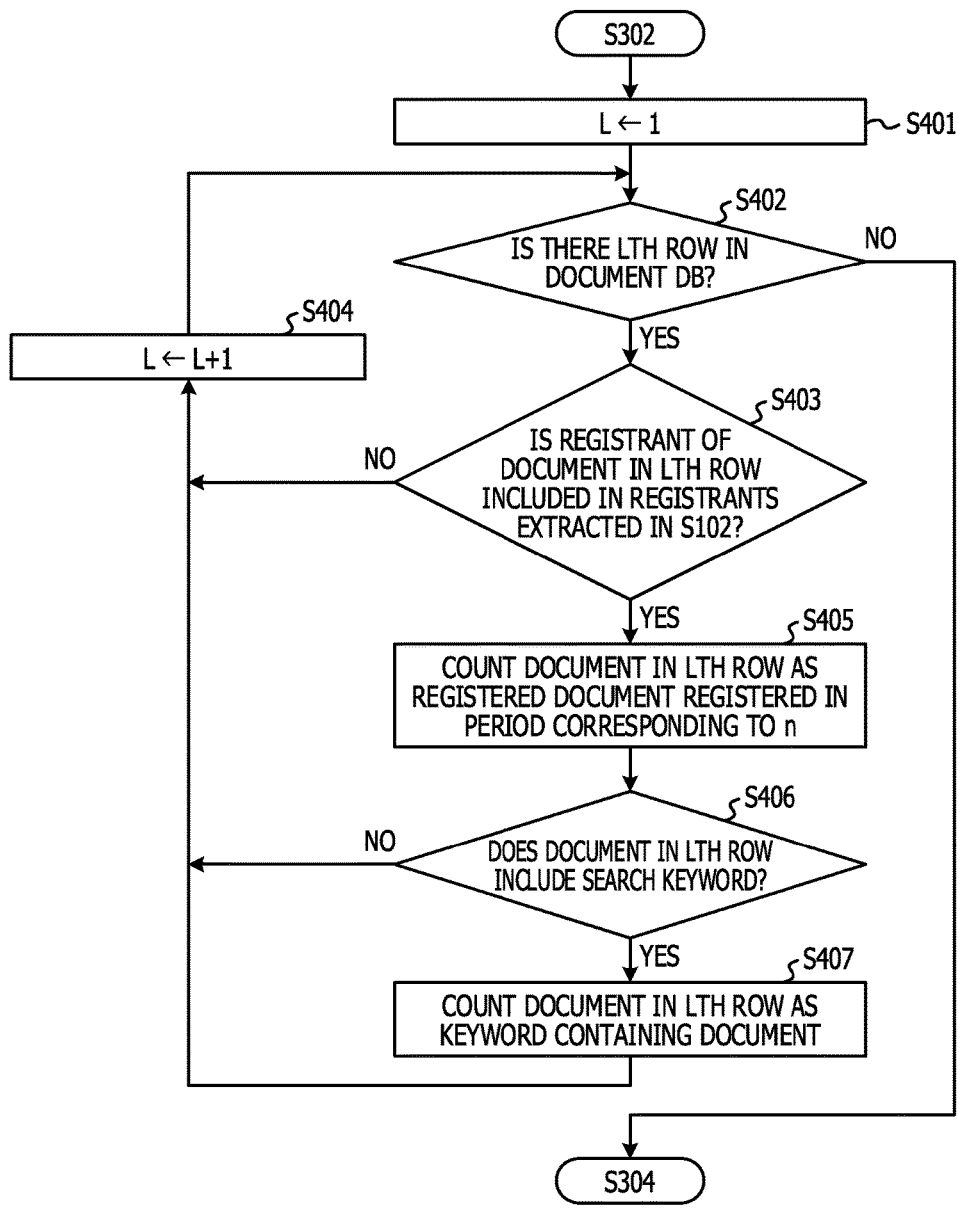
FIG. 8 is a flowchart illustrating an example of processing of obtaining information on a number of all registered documents registered in a period corresponding to n and information on a number of keyword containing documents registered in the period corresponding to n in S303.

FIG. 8 is a flowchart illustrating an example of processing of obtaining information on a number of all registered documents registered in a period corresponding to n and information on a number of keyword containing documents registered in the period corresponding to n in S303.

In S303, in order to search from the first row of the document DB, the search unit 14 first initializes the value of L, and stores 1 in L (S401).

Next, the search unit 14 searches the document DB, and determines whether or not there is an Lth row in the document DB (S402). When there is an Lth row in the document DB (affirmative in S402), the search unit 14 refers to a document registered in the Lth row of the document DB, and determines whether or not a registrant of the document in the Lth row is included in the registrants extracted in S102 (S403).

When it is determined that the registrant of the document in the Lth row is not included in the registrants extracted in S102 (negative in S403), the search unit 14 increments the value of L, and thereby sets a value obtained by adding 1 to L as a new value of L, to search for a next row in the document DB (S404). The search unit 14 thereafter returns to S402 to perform the processing from S402 on down again. When it is determined that the registrant of the document in the Lth row is included in the registrants extracted in S102 (affirmative in S403), on the other hand, the counting unit 15 counts the document in the Lth row as a registered document registered in the period corresponding to n (S405). Particularly, a variable is set which indicates the number of registered documents registered in the period corresponding to n, and 0 is stored as an initial value in the variable. Then, the number of registered documents registered in the period corresponding to n is counted by adding 1 to the variable each time an affirmative determination is made in S403. When the processing of S303 is ended, the information on the number of all of the registered documents registered in the period corresponding to n can be obtained.

After the processing of S405, the search unit 14 determines whether or not the document in the Lth row includes the search keyword (S406). When the document in the Lth row does not include the search keyword (negative in S406), the search unit 14 performs the processing in S404 of incrementing the value of L, and thereafter returns to S402 to perform the processing from S402 on down again. When the document in the Lth row includes the search keyword (affirmative in S406), on the other hand, the counting unit 15 counts the document in the Lth row as a keyword containing document (S407). Particularly, a variable is set which indicates the number of keyword containing documents registered in the period corresponding to n, and 0 is stored as an initial value in the variable. Then, the number of registered documents registered in the period corresponding to n is counted by adding 1 to the variable each time an affirmative determination is made in S406. When the processing of S303 is ended, the information on the number of keyword containing documents registered in the period corresponding to n can be obtained.

After the processing of S407, the score calculating unit 16 performs the processing in S404 of incrementing the value of L, and thereafter returns to S402. Then, the score calculating unit 16 performs the processing from S402 on down again to refer to the new Lth row in the document DB.

When the processing for all of the rows of the document DB is eventually ended, it is determined in S402 that there is no Lth row in the document DB (negative in S402), and the processing proceeds to S304. The processing of S303 is thereby completed.

Next, the score calculating unit 16 calculates a parameter α constituted of the logarithmic value of the number of keyword containing documents (S304). In S304, the parameter α in the period whose period ID is n is calculated by using the following Equation (1), for example.

$$\alpha = \log_2(df_n + 1) \qquad \text{Equation (1)}$$

n: period ID
$df_n$: the number of keyword containing documents in the period of n For example, when the number of keyword containing documents of a certain registrant in the period whose period ID is n is 7, α=3 can be calculated by assigning 7 to $df_n$ in Equation (1). As illustrated in Equation (1), the parameter α is a parameter whose value is increased as the number of keyword containing documents is increased. By calculating the logarithm of the number of keyword containing documents, in a case where the number of keyword containing documents differs between registrants, a difference in αbetween the registrants is widened. Thus, a difference between expert values calculated using α can be widened. Therefore, the levels of expertise of the registrants can be compared with each other more easily on the basis of the expert values.

Next, the score calculating unit 16 calculates a parameter β constituted of a ratio of the number of keyword containing documents to the number of all of the registered documents (S305).

A method of calculating the parameter β will be described in the following.

Figure 9:
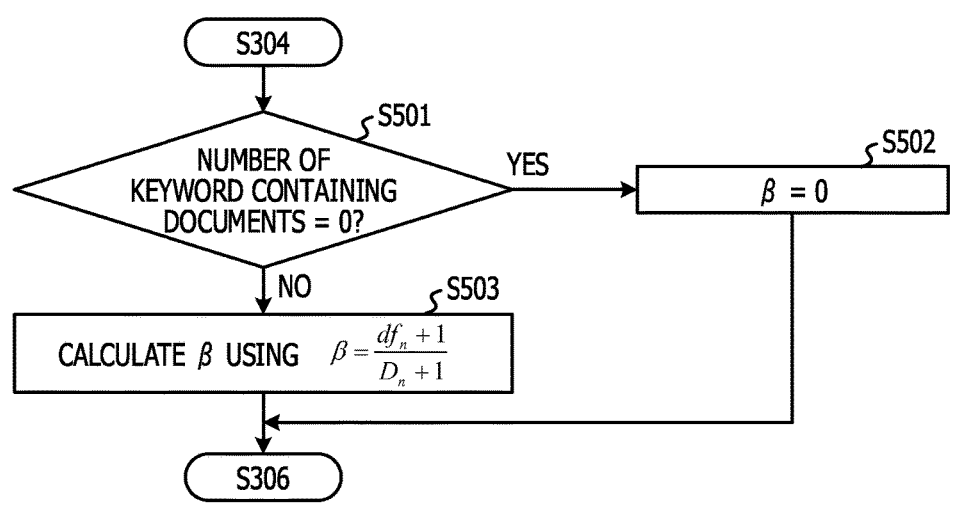
FIG. 9 is an example of a flowchart illustrating a method of calculating a parameter $\beta$ in S305.

FIG. 9 is an example of a flowchart illustrating a method of calculating a parameter β in S305.

In S305, the score calculating unit 16 first determines whether or not the value of the number of keyword containing documents obtained in S303 is 0 (S501). When the value of the number of keyword containing documents is 0 (affirmative in S501), the value of β in the period is set to β=0 (S502). When the value of the number of keyword containing documents is not 0 (negative in S501), on the other hand, the score calculating unit 16 calculates the parameter β in the period whose period ID is n by using the following Equation (2), for example (S503).

$$\beta = \frac{df_n + 1}{D_n + 1} \qquad \text{Equation (2)}$$

$df_n$: the number of keyword containingdocuments in the period of n
$D_n$: the number of all of the registered documents in the period of n For example, when the number of all of the registered documents of a certain registrant in the period of n is nine, and the number of keyword containing documents of the certain registrant in the period of n is four, β=0.5 can be calculated by assigning 9 to $D_n$ and assigning 4 to $df_n$ in Equation (2).

As illustrated in Equation (2), the parameter β is a parameter whose value is increased as the ratio of the number of the keyword containing documents registered in a certain period becomes higher. However, β becomes 0 when β is calculated by using Equation (2) in a case where the value of $D_n$ and $df_n$ are 0. Thus, the value of β becomes larger than 0 even though no keyword containing documents are extracted. Accordingly, as illustrated in S502, β is set to be β=0 when the value of the number of keyword containing documents is 0. Therefore the above-described problem can be avoided.

The score calculating unit 16 calculates the parameter β as described above.

Returning to FIG. 7, after the processing of S305, the score calculating unit 16 reads out a parameter γ corresponding to each period from the second storage unit 12. γ is an index indicating the newness of the period. γ is set for each period in advance, and is stored in the second storage unit 12. The value of γ for each period can be calculated by Equation (3), for example, on the basis of m−n, which is a difference between m as the period ID of a newest period which period ID is a maximum value of n and n as the period ID of the period as an object for calculation.

$$\gamma = \frac{1}{\log_{1000}(m - n + 1) + 1} \qquad \text{Equation (3)}$$

m: maximum value of n

When the numbers in the document DB are given in order from the oldest document, that is, when the rows in the document DB are in order of registration, the value of m can be identified from the date of registration of a document in a last row in the document DB. On the other hand, when the numbers in the document DB are not given in order from the oldest document, searches are made for all of the rows of the document DB in the processing of S102 illustrated in FIG. 6. Therefore, the value of m can be identified on the basis of a document having a newest date of registration in all of the searched-for rows when the searches are ended.

As an example, the parameter γ in 2006 is calculated. The period ID corresponding to the year 2006 is 2006. Supposing that the newest period is the year 2013, m=2013. Hence, the parameter γ can be calculated to be γ≈0.77 by assigning 2013 to m and assigning 2006 to n in Equation (3).

FIG. 10 is a diagram illustrating an example of a parameter γ set for each period based on Equation (3). The value of γ is displayed to three decimal places in the field of γ. As illustrated in FIG. 10, the parameter γ is a coefficient whose value is increased as the period becomes newer. As in the case of the parameter α, a difference between the values of γ of the respective periods can be widened by calculating the parameter γ using a logarithm.

Returning to FIG. 7, the score calculating unit 16 calculates a score in the period of n using the parameter α calculated in S304, the parameter β calculated in S305, and the parameter γ read out from the second storage unit 12 (S306).

$$\text{Score} = \alpha \times \beta \times \gamma \quad \text{Equation (4)}$$

$$= \log_2(df_n + 1) \times \frac{df_n + 1}{D_n + 1} \times \frac{1}{\log_{1000}(m - n + 1) + 1}$$

As represented in Equation (4), the score is calculated by multiplying the ratio of the number of keyword containing documents to the number of all of the registered documents (parameter β) by the index (parameter γ) indicating the newness of the period, and weighting a value obtained by the multiplication with the logarithm of the number of keyword containing documents (parameter α).

Next, the score calculating unit 16 adds 1 to the variable n (S307). For example, when 2006 is stored in the variable n, and 1 is added to n, n=2007 is newly set, and the processing object changes to the year 2007, which is a period one year after the year 2006.

Next, the score calculating unit 16 determines whether or not the newly set variable n is larger than m (S308). When it is not determined that the variable n is larger than m (negative in S308), it is determined that scores for all of the periods with respect to the registrant selected in S301 are not calculated, and the processing proceeds to S303. The score calculating unit 16 then performs the processing from S303 on down again. When it is determined that the variable n is larger than m (affirmative in S308), on the other hand, the variable n exceeds the maximum value m of the period ID, and it is thus determined that the scores for all of the periods with respect to the registrant selected in S301 are calculated. The processing then proceeds to S309.

In S309, the score calculating unit 16 determines whether or not all of the registrants extracted in S102 are selected. When it is determined that not all of the registrants are selected (negative in S309), it is determined that the scores for all of the registrants for each period are not calculated, and the processing proceeds to S301. Then, the processing from S301 on down is performed again. When it is determined that all of the registrants are selected (affirmative in S309), on the other hand, it is determined that the scores for all of the registrants for each period are calculated, and the processing proceeds to S104. Simultaneously with this, the processing of calculating the scores is ended.

Returning to FIG. 4, in S104, the expert value calculating unit 17 calculates an expert value for each of the registrants extracted in S102. In S104, the expert value can be calculated by adding together all of the scores for the respective periods which scores are calculated in S103 for each registrant. A concrete example of the processing of S104 will be described in the following.

Figure 11:
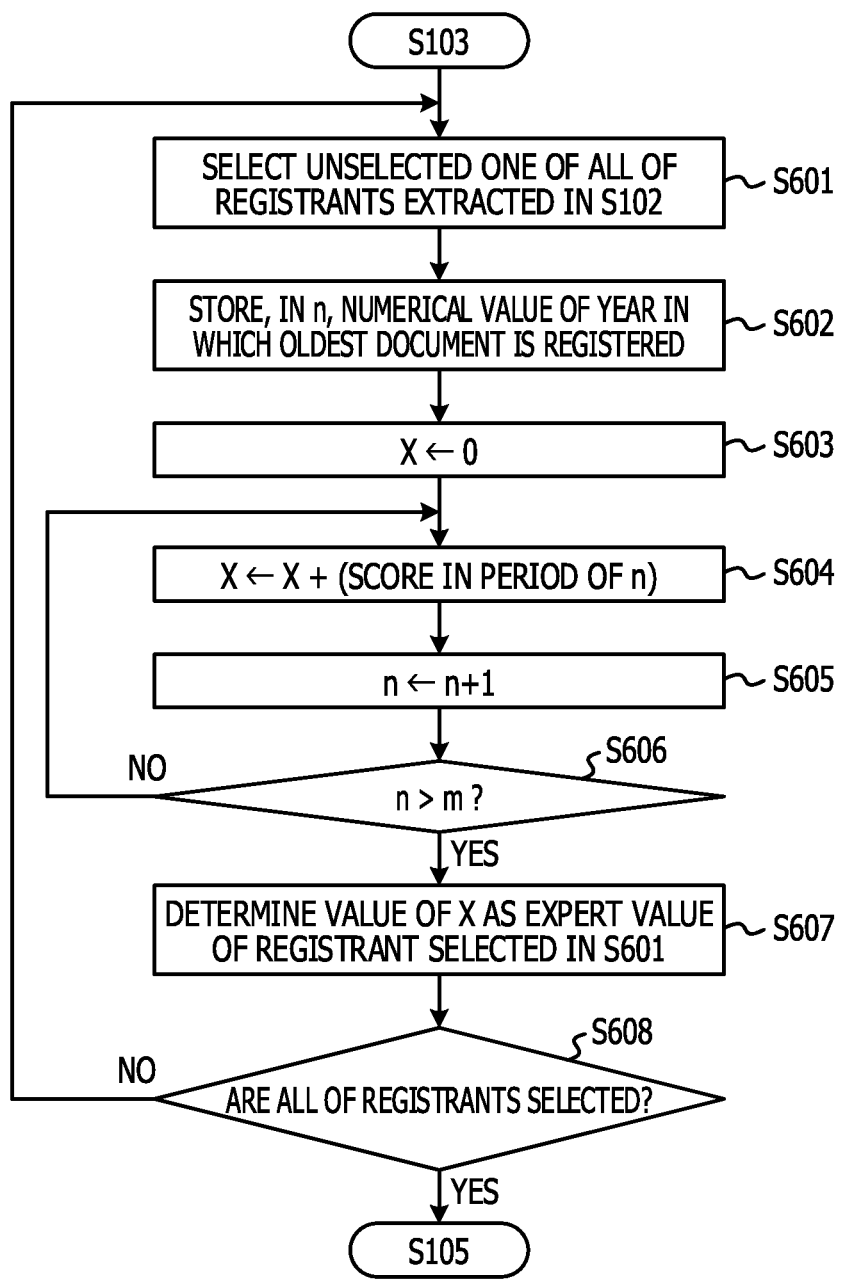
FIG. 11 is a flowchart illustrating an example of processing of calculating an expert value in S104.

FIG. 11 is a flowchart illustrating an example of processing of calculating an expert value in S104.

In S104, the expert value calculating unit 17 first selects an unselected one of all of the registrants extracted in S102 (S601).

Next, the expert value calculating unit 17 stores, in a variable n, the numerical value of the year in which the oldest document is registered among the documents stored in the document DB (S602). The processing of S602 is substantially similar to the processing of S302 in FIG. 7, and therefore detailed description thereof will be omitted.

Next, the expert value calculating unit 17 stores 0 in a variable X to initialize the value of the variable X (S603). In the following, the variable X is used to calculate an expert value.

Next, the expert value calculating unit 17 adds, to the variable X, the score in the period n which score corresponds to the registrant selected in S601 (S604). In S604, the value stored in the variable X is updated by adding the score in the period n which score is calculated in S103 to the variable X.

Next, the expert value calculating unit 17 adds 1 to the variable n (S605).

Next, the expert value calculating unit 17 determines whether or not the newly set variable n is larger than m (S606). When it is not determined that the variable n is larger than m (negative in S606), it is determined that the processing of updating the variable X is not completed, and the processing returns to S604. The expert value calculating unit 17 then performs the processing from S604 on down again. When it is determined that the variable n is larger than m (affirmative in S606), on the other hand, the variable n exceeds the maximum value m of the period ID, and it is thus determined that the processing of updating the variable X is completed. That is, at this point, all of the scores for the respective periods which scores correspond to the registrant selected in S601 are added together, and a value obtained by adding together the scores is stored in the variable X. The expert value calculating unit 17 then determines the value stored in the variable X as the expert value of the registrant selected in S601 (S607).

Next, the expert value calculating unit 17 determines whether or not all of the registrants extracted in S102 are selected (S608). When it is determined that all of the registrants are not selected (negative in S608), it is determined that the expert values of all of the registrants are not calculated, and the processing returns to S601. Then, the processing from S601 on down is performed again. When it is determined that all of the registrants are selected (affirmative in S608), on the other hand, it is determined that the expert values of all of the registrants are calculated, and the processing proceeds to S105. The processing of calculating the expert value of each registrant is thereby ended.

When the year in which the oldest document is registered among the documents stored in the document DB is the year 2006, the expert value calculated in the processing of S104 can be expressed by the following Equation (5), for example.

$$\text{Expert Value} = \sum_{i=2006}^{m} (\alpha \times \beta \times \gamma) \quad \text{Equation (5)}$$

$$= \sum_{i=2006}^{m} \left\{ \log_2(df_i + 1) \times \frac{df_i + 1}{D_i + 1} \times \frac{1}{\log_{1000}(m - i + 1) + 1} \right\}$$

As illustrated in Equation (5), the expert value calculating unit 17 calculates the expert value by adding together all of the scores α×β×γ calculated for the respective periods from the year in which the oldest document is registered to the newest year. When this equation is used, a registrant who has maintained a certain score over a long period tends to obtain a higher expert value than a registrant who is given a locally high score only for limited periods.

FIG. 12 is a diagram illustrating an example of a result of calculating scores and expert values. In FIG. 12, the number of keyword containing documents is denoted as a "KW frequency." The number of all of the registered documents is denoted as a "total frequency." The registrants extracted in S102 are the following four registrants: Suzuki, Hashimoto, Nakamura, and Inoue. In the present embodiment, suppose that Suzuki is a field manager who has continued managing work related to the search keyword from the year 2006 to the present time. Suppose that Hashimoto is a field person in charge who was transferred to a workplace in another field in the year 2010. Suppose that Nakamura is a field person in charge who has continued to be in charge of the work related to the search keyword at least from the year 2006 to the present time. Suppose that Inoue is a field person in charge who joined the company in the year 2009 and is a field person in charge who has continued to be in charge of the work related to the search keyword up to the present time. When the expert values of the respective registrants are calculated on the basis of the KW frequencies and the total frequencies in each period illustrated in FIG. 12, the expert value of Suzuki is calculated to be 6.57, the expert value of Hashimoto is calculated to be 9.47, the expert value of Nakamura is calculated to be 13.49, and the expert value of Inoue is calculated to be 9.61. Each of these values is calculated by rounding the value calculated on the basis of Equation (5) to two decimal places.

Changes in the numbers of documents registered by the registrants extracted in S102 will be described in the following.

Figure 13A:
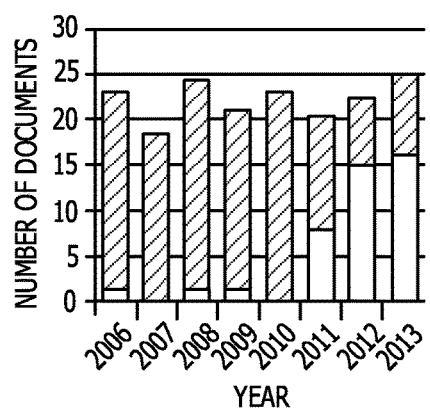
FIG. 13A is a diagram illustrating a number of documents registered in each period by a registrant, the diagram being created based on the data of FIG. 12.
Figure 13B:
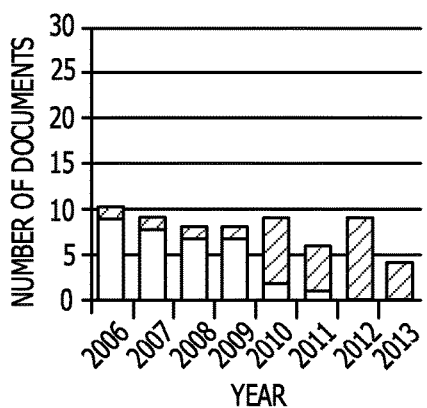
FIG. 13B is a diagram illustrating a number of documents registered in each period by a registrant, the diagram being created based on the data of FIG. 12.
Figure 13C:
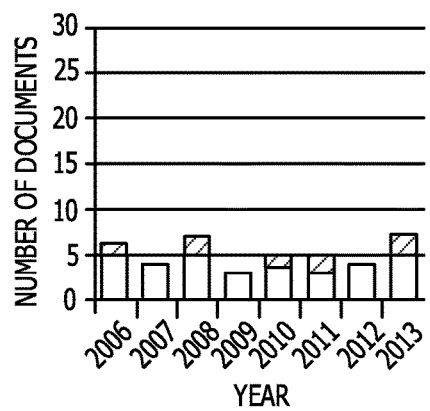
FIG. 13C is a diagram illustrating a number of documents registered in each period by a registrant, the diagram being created based on the data of FIG. 12.
Figure 13D:
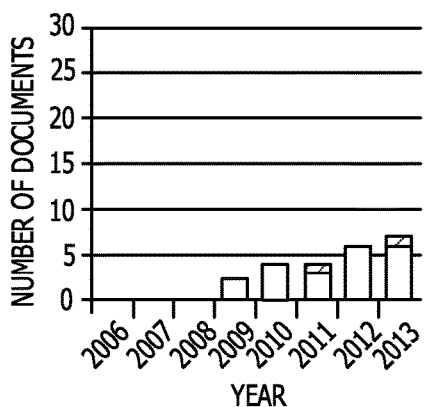
FIG. 13D is a diagram illustrating a number of documents registered in each period by a registrant, the diagram being created based on the data of FIG. 12.

FIGS. 13A to 13D are diagrams illustrating numbers of documents registered in each period by respective registrants, the diagrams being created based on the data of FIG. 12. FIG. 13A illustrates data on the numbers of documents registered by Suzuki. FIG. 13B illustrates data on the numbers of documents registered by Hashimoto. FIG. 13C illustrates data on the numbers of documents registered by Nakamura. FIG. 13D illustrates data on the numbers of documents registered by Inoue. In bar graphs in FIGS. 13A to 13D, unhatched parts represent keyword containing documents, while hatched parts represent documents other than the keyword containing documents.

FIG. 13A represents data on the numbers of registered documents of Suzuki. Because Suzuki is the field manager, the number of registered documents of Suzuki in all periods tends to be larger than the numbers of registered documents of the other three registrants. The number of registered keyword containing documents of Suzuki in and before the year 2010 is low at zero or one. The ratio of the number of keyword containing documents to the number of all of the registered documents of Suzuki in and after the year 2011 is increased from the ratio in and before the year 2010.

FIG. 13B represents data on the numbers of registered documents of Hashimoto. The number of registered documents of Hashimoto tends to be lower than the number of registered documents of Suzuki as the field manager in all of the periods. The above-described ratio of the number of keyword containing documents of Hashimoto in and after the year 2010 is decreased sharply. This is because Hashimoto was transferred to a workplace in another field in the year 2010.

FIG. 13C represents data on the numbers of registered documents of Nakamura. As in the case of Hashimoto, the number of registered documents of Nakamura in all of the periods also tends to be lower than the number of registered documents of Suzuki as the field manager. Nakamura maintained the above-described ratio of the number of keyword containing documents in all of the periods at 50% or higher.

FIG. 13D represents data on the numbers of registered documents of Inoue. As in the case of Hashimoto and Nakamura, the number of registered documents of Inoue in all of the periods also tends to be lower than the number of registered documents of Suzuki as the field manager. Inoue did not register documents in or before the year 2008. This is because Inoue did not join the company until the year 2009.

Returning to FIG. 4, the expert sorting unit 18 sorts the registrants on the basis of the expert values calculated in S104 (S105). Sorting the registrants on the basis of the expert values provides a ranking result in which the experts in the field related to the search keyword are arranged in order of decreasing level of expertise. The ranking of the experts without the use of the expert values is as follows.

FIG. 14 is a diagram illustrating an example of a result of ranking experts based on numbers of documents including a search keyword. As described earlier, field managers managing work related to the search keyword tend to register a large number of documents in the database. Therefore, when ranking is performed on the basis of the numbers of documents including the search keyword, field managers may be ranked high irrespective of levels of expertise in relation to the search keyword, as illustrated in FIG. 14. When the display device 66 displaying an expert search result has a limited range of display on a screen, that is, when ranking is performed in rank descending order, which is an order in a descending direction from a highest rank to a lowest rank, from one end within the range of screen display to another end opposite to the one end, field persons in charge, who are experts in relation to the search keyword, may be ranked low, and out of the range of screen display, as illustrated in FIG. 14.

FIG. 15 is a diagram illustrating an example of a result of ranking experts which result is generated based on expert values. As illustrated in FIG. 15, three registrants within the range of screen display are Nakamura, Hashimoto, and Inoue. Nakamura, who has continued to be in charge of the work related to the search keyword over all of the periods, is ranked highest. Each of the registrants within the range of screen display is a field person in charge.

Further, reference to FIG. 15 indicates that Inoue, who has continued to be in charge of the work in and after the year 2009, is ranked higher than Hashimoto, who was in charge of the work in and before the year 2010. This indicates that as a result of the use of Equation (5), the newer the period in which a registrant is in charge of the work, the higher the expert value.

On the other hand, Suzuki, who is the field manager ranked highest in the ranking based on the frequencies of the search keyword in FIG. 14, is ranked low, and is out of the range of screen display. This indicates that the ranking of Suzuki is affected by a shorter period of time in which the ratio of the number of keyword containing documents of Suzuki exceeds 50% than those of Hashimoto, Nakamura, and Inoue.

Returning to FIG. 4, after S105, the transmitting unit 19 transmits the sort result to the terminal apparatus 30 that transmitted the search keyword (S106). The user of the terminal apparatus 30 as a search request source can thereby obtain the expert search result related to the search keyword.

As described above, the expert search apparatus 10 can search for experts in a particular field.

Generally, in many cases, the longer the period of time in which a registrant continues to be in charge of the work related to the search keyword, the higher the level of expertise possessed by the registrant. The closer to the present time the period of time in which the registrant continues to be in charge of the work, the stronger the possibility of the registrant having latest expertise. Thus, the registrant often has a higher level of expertise.

According to the present embodiment, a score in each period which score serves as a basis in calculating an expert value includes, as a parameter, the ratio of the number of keyword containing documents to the number of all of the registered documents. The expert value is calculated by adding together all of the scores in respective periods after calculating the score in each period. According to this method, the ratio of the number of keyword containing documents in each period and the length of a period of time in which the registrant is engaged in the work related to the keyword are reflected in the expert value. Therefore, a registrant who continues to be in charge of the work related to the search keyword for a longer period tends to obtain a higher expert value. Thus, in searching for experts, it is possible to extract all field persons in charge who have a high level of expertise in relation to the search keyword.

Further, a score in each period also includes, as a parameter, the index $\gamma$ indicating the newness of the period. According to this method, the period of time in which the registrant is engaged in the work related to the keyword is also reflected in the expert value. Thus, the closer to the present time the period in which the ratio of the number of keyword containing documents of the registrant is high, the higher the expert value that can be obtained by the registrant. In other words, the longer the period in which the registrant continues to be in charge of the work related to the keyword, and the closer to the present time the period in which the ratio of the number of keyword containing documents of the registrant is high, the higher the expert value that can be obtained by the registrant. Then, in searching for experts, registrants satisfying the above-described conditions are extracted easily.

As described above, the accuracy of searching for experts on the basis of the search keyword can be improved by performing the ranking of registrants on the basis of the expert values calculated by the method illustrated in the present embodiment.

[Second Embodiment]

A second embodiment will next be described. The configuration of the expert search system illustrated in FIGS. 1 to 3 can be used for an expert search system configured to realize the second embodiment. Therefore description of the configuration of the expert search system according to the second embodiment will be omitted.

In the first embodiment, when a document includes a word corresponding to a search keyword at even only one place, the document is extracted as a keyword containing document. On the other hand, the second embodiment is characterized in that when the number of appearances of a search keyword in a document is less than a given threshold value, the document is excluded from keyword containing documents.

Figure 16:
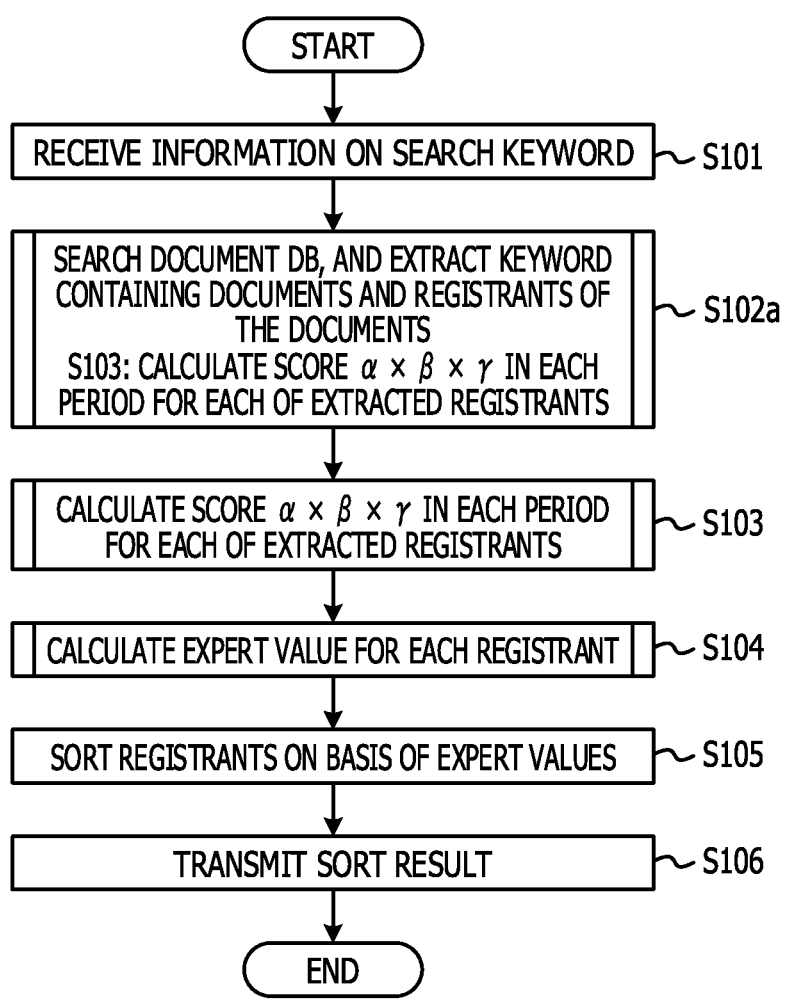
FIG. 16 is a flowchart illustrating an example of an expert search method by an expert search apparatus in a second embodiment.

FIG. 16 is a flowchart illustrating an example of an expert search method by an expert search apparatus in the second embodiment. Processing performed in S101 is similar to the processing of the first embodiment, and therefore description of the processing will be omitted. After receiving a search keyword in S101, the search unit 14 extracts keyword containing documents and the registrants of the documents while referring to a document DB stored in the second storage unit 12 (S102a). The processing of S102a will be concretely described in the following.

Figure 17:
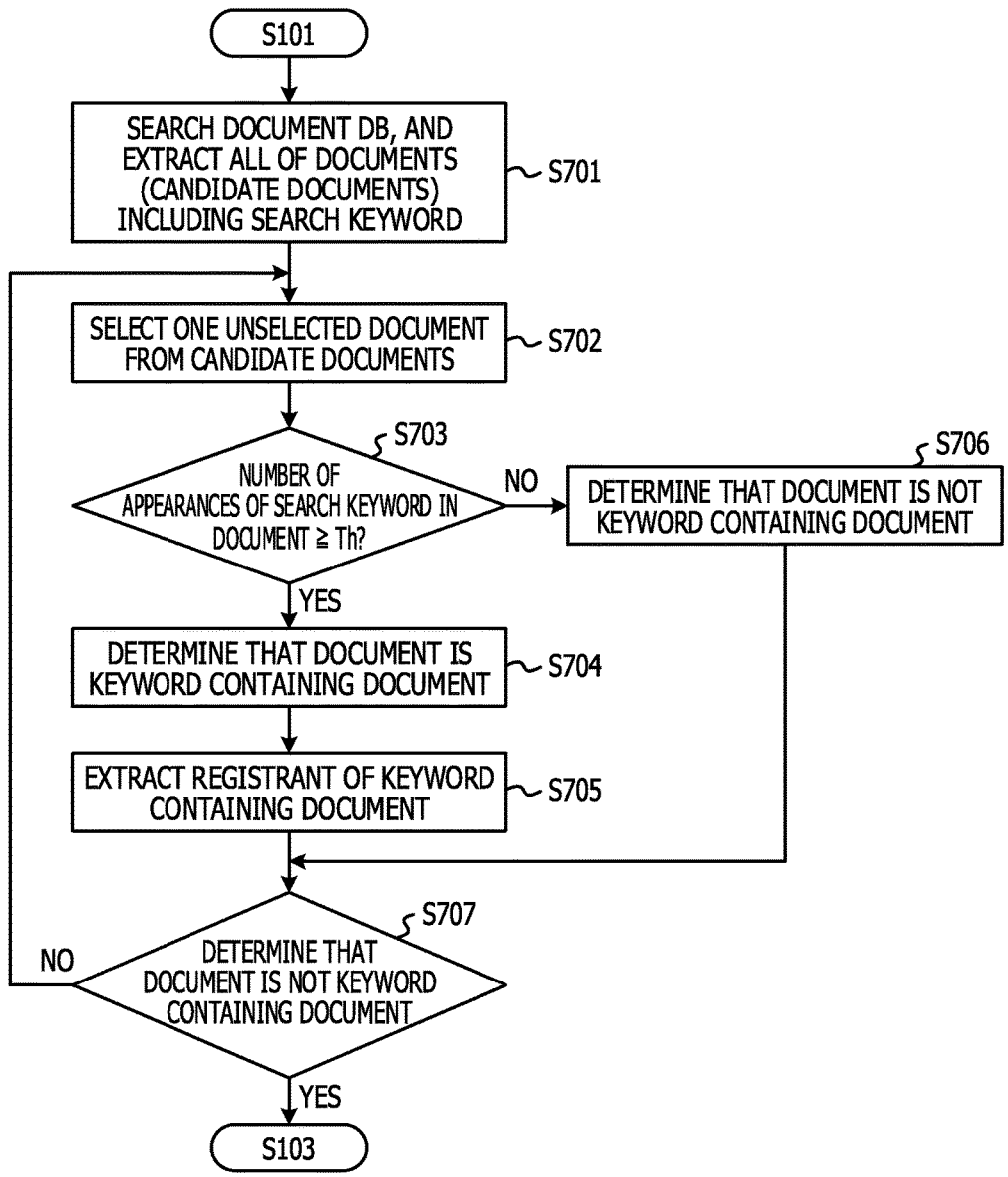

FIG. 17 is a flowchart illustrating an example of processing of extracting a keyword containing document in S102a.

First, the search unit 14 searches the document DB stored in the second storage unit 12 to extract all documents including the search keyword (S701). In the second embodiment, the documents including the search keyword which documents are extracted in S701 will be referred to as candidate documents.

Next, the search unit 14 selects one unselected document from the candidate documents (S702).

Next, the search unit 14 determines whether or not the number of appearances indicating the number of times that the search keyword appears within the document selected in S702 is equal to or more than a given threshold value Th (S703). That is, in S703, the number of times that the search keyword appears in the document selected in S702 is counted. Then, the counted number of appearances is compared with the given threshold value. The threshold value Th used for the comparison is preferably 5 or less, and is for example 2.

When the number of appearances of the search keyword in the document is equal to or more than the given threshold value Th (affirmative in S703), the search unit 14 determines that the document is a keyword containing document (S704), and extracts the registrant of the keyword containing document (S705). The search unit 14 thereafter proceeds to S707. When the search unit 14 determines that the number of appearances of the search keyword in the document is not equal to or more than the given threshold value Th (negative in S703), on the other hand, the search unit 14 determines that the document is not a keyword containing document (S706), and then proceeds to S707.

In S707, the search unit 14 determines whether or not all of the candidate documents are selected. When the search unit 14 determines that not all of the candidate documents are selected (negative in S707), the search unit 14 returns to S702 to perform the processing from S702 on down again. When the search unit 14 determines that all of the candidate documents are selected (affirmative in S707), on the other hand, the search unit 14 proceeds to S103.

The processing of extracting a keyword containing document in S102a is performed as described above. Processing from S103 on down is similar to the processing from S103 on down which processing is described in the first embodiment, and therefore description of the processing will be omitted.

According to the present embodiment, after a document including the search keyword is extracted, the number of appearances of the search keyword within the document is counted. When the count value is less than the given threshold value, the document is excluded from keyword containing documents. Some documents may have the word of the search keyword appearing in the text of the documents even though the documents have contents unrelated to the search keyword. According to the present embodiment, documents remotely related to the search keyword can be excluded from keyword containing documents on the basis of information on the number of appearances of the search keyword. Thus, the accuracy of selecting documents related to the search keyword is improved, and the validity of expert values can be increased.

[Third Embodiment]

A third embodiment will next be described. The configuration of the expert search system illustrated in FIGS. 1 to 3 can be used for an information processing system for realizing the third embodiment. Therefore description of the configuration of the information processing system according to the third embodiment will be omitted.

In the first embodiment, all of registrants who registered documents including the search keyword are extracted in S103 in FIG. 4. On the other hand, the third embodiment is characterized in that the category (function or job description) of search objects as experts is specified in advance. A number (No.) for uniquely identifying a document, a registrant who registered the document, a date of registration, the name of the document, and the category (function or job description) of the registrant are registered in a document DB used in the third embodiment in association with each other.

Figure 18:
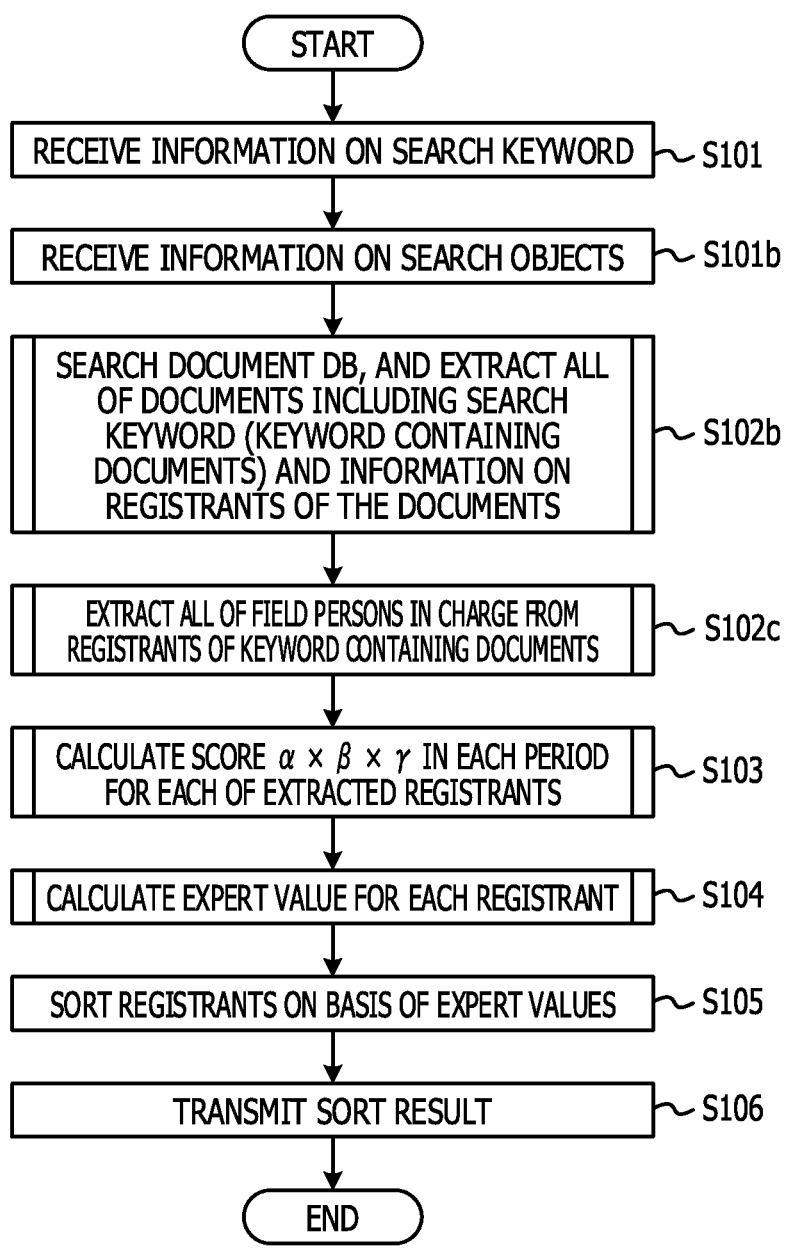
FIG. 18 is a flowchart illustrating an example of an expert search method by an expert search apparatus in a third embodiment.

FIG. 18 is a flowchart illustrating an example of an expert search method by an expert search apparatus in the third embodiment. Processing performed in S101 is similar to the processing of the first embodiment and the processing of the second embodiment, and therefore description of the processing will be omitted. After the processing of S101, the receiving unit 13 receives search object information specified and input by the user of the terminal apparatus 30 (S101b). The search object information includes, for example, a specification to the effect that field managers are to be excluded from search objects and the search objects are to be limited to only field persons in charge. The processing performed in S101b can also be performed as an identical processing step in the processing performed in S101. That is, the search object information can also be received simultaneously with a search keyword received in S101. Alternatively, the processing of S101 can also be performed after the processing of S101b is performed. The following description will be made supposing that the user of the terminal apparatus 30 makes a specification to the effect that search objects are to be limited to field persons in charge.

After the processing of S101b, the search unit 14 searches a document DB stored in the second storage unit 12 using the search keyword to extract all documents including the search keyword and information on the registrants of the documents (S102b).

Figure 19:
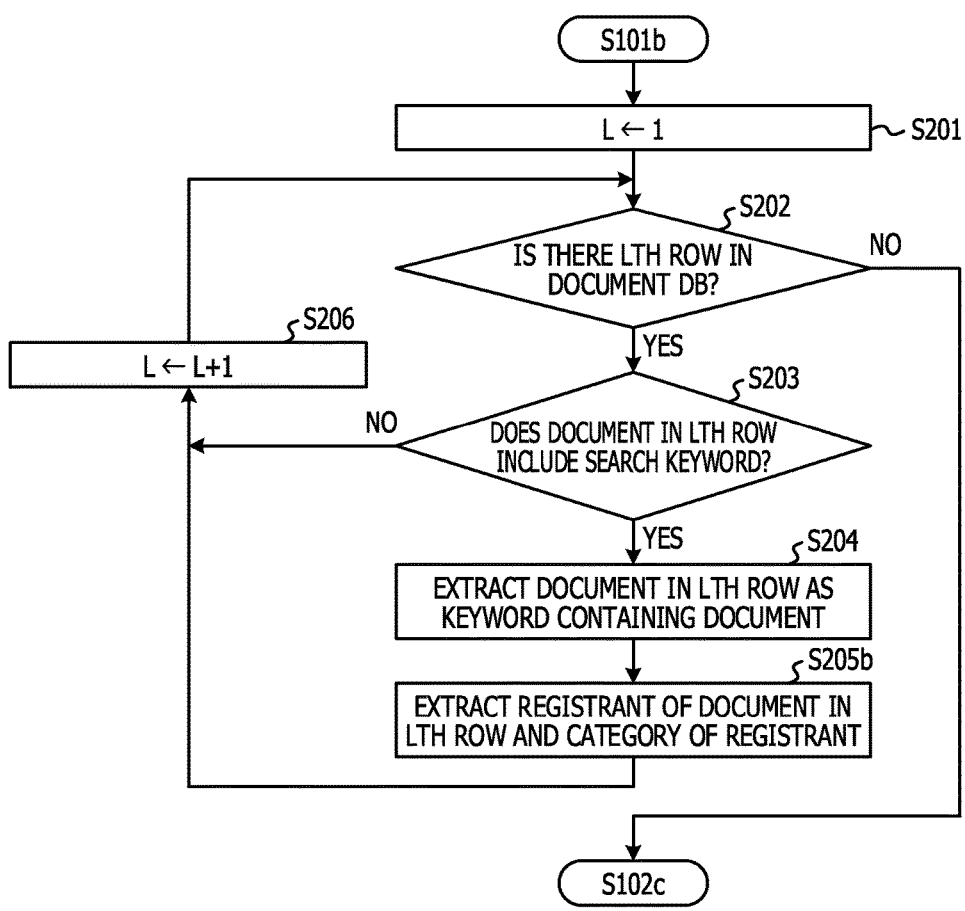
FIG. 19 is a flowchart illustrating an example of processing of extracting a keyword containing document and a registrant in S102b.

FIG. 19 is a flowchart illustrating an example of processing of extracting a keyword containing document and a registrant in S102b. The search unit 14 performs processing from S201 to S204, and after the processing of S204, the search unit 14 extracts information on the registrant of the document in the Lth row and the category of the registrant (S205b). The search unit 14 can thereby grasp not only the extracted registrant but also the category to which the extracted registrant belongs to. After the processing of S205b, the search unit 14 proceeds to S206. The processing of S206 is similar to the processing illustrated in FIG. 8, and therefore description of the processing will be omitted.

Returning to FIG. 18, after the processing of S102b, the search unit 14 extracts all of field persons in charge from the registrants who registered the keyword containing documents (S102c). The processing of S102c will be concretely described in the following.

Figure 20:
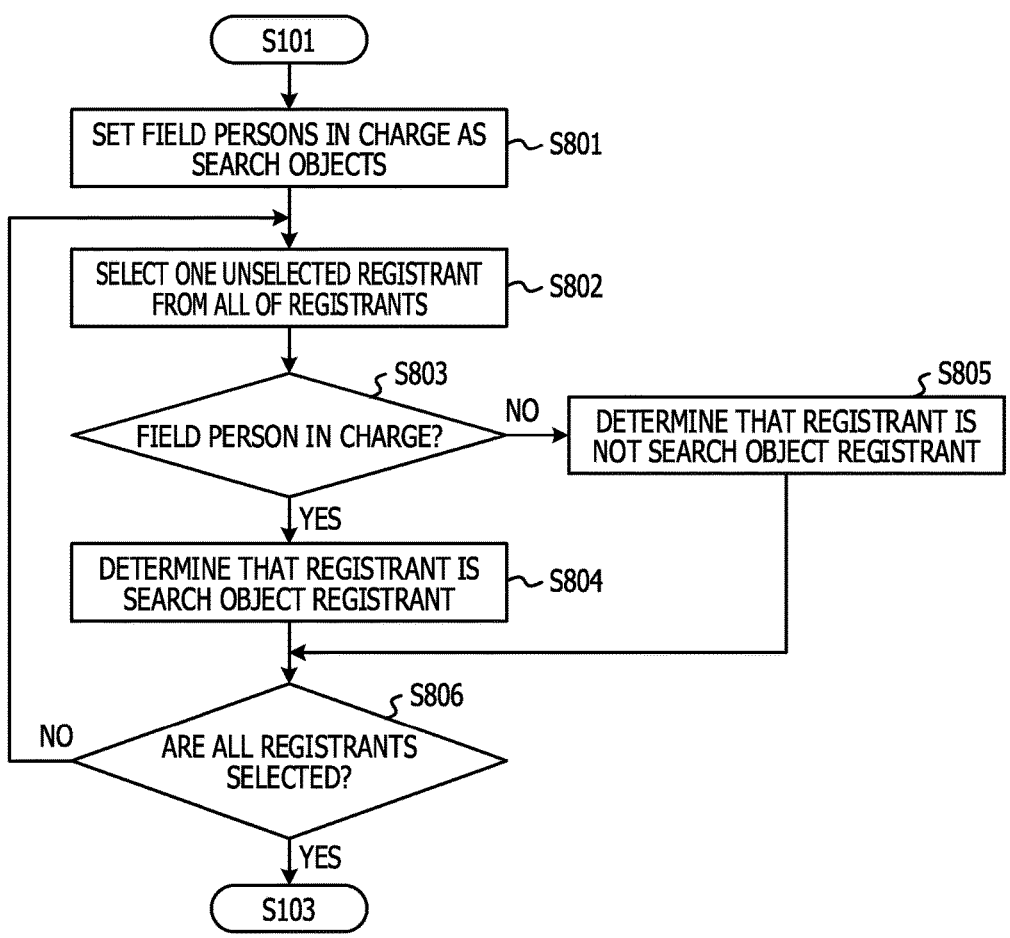
FIG. 20 is a flowchart illustrating an example of processing of extracting a field person in charge in S102c.

FIG. 20 is a flowchart illustrating an example of processing of extracting a field person in charge in S102c.

The search unit 14 sets field persons in charge as search objects on the basis of the search object information received from the receiving unit 13 (S801).

Next, the search unit 14 selects one unselected registrant from all of the registrants extracted in S102b (S802).

Next, the search unit 14 determines whether or not the registrant selected in S802 is a field person in charge (S803). The search unit 14 can determine whether or not the registrant selected in S802 is a field person in charge by referring to the category extracted in association with the registrant in S205b. When the selected registrant is a field person in charge (affirmative in S803), the search unit 14 determines that the selected registrant is a search object registrant (S804), and proceeds to S806. When the selected registrant is not a field person in charge (negative in S803), on the other hand, the search unit 14 determines that the selected registrant is not a search object registrant (S805), and proceeds to S806.

In S806, the search unit 14 determines whether or not all of the registrants are selected. When the search unit 14 determines that not all of the registrants are selected (negative in S806), the search unit 14 returns to S802 to perform the processing from S802 on down again. When the search unit 14 determines that all of the registrants are selected (affirmative in S806), on the other hand, the search unit 14 proceeds to S103.

The processing of extracting the field persons in charge in S102c is performed as described above. Each piece of processing from S103 on down which processing follows S102c is similar to each piece of processing from S103 on down which processing is described in the first embodiment or the second embodiment, and therefore description of the processing will be omitted.

According to the present embodiment, only field persons in charge who are specified as a search range by the terminal apparatus are extracted from all of the registrants who registered the documents including the search keyword. According to this method, the expert search does not extract field managers when the search request source is looking for only field persons in charge in launching a new project, for example. Therefore, a result of search specialized in field persons in charge can be obtained.

[Fourth Embodiment]

A fourth embodiment will next be described. In the first embodiment, the information on the number of all of the registered documents registered in each period and the information on the number of keyword containing documents in each period are obtained in S303 in FIG. 7 to calculate the ratio of the number of keyword containing documents to the number of all of the registered documents (the parameter $\beta$). On the other hand, the fourth embodiment is characterized in that information on the number of search keyword containing documents in each period and information on the number of documents not containing the search keyword in each period are obtained to calculate the parameter $\beta$.

The configuration of the expert search system illustrated in FIG. 1 and FIG. 2 can be used for an information processing system for realizing the fourth embodiment. Therefore description of the configuration of the information processing system according to the fourth embodiment will be omitted. A configuration of a counting unit 15 in the fourth embodiment will be described in the following.

Figure 21:
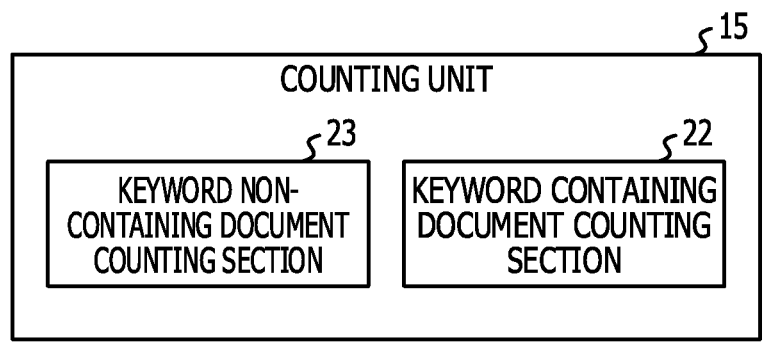
FIG. 21 is a diagram illustrating an example of a configuration of a counting unit in a fourth embodiment.

FIG. 21 is a diagram illustrating an example of a configuration of a counting unit in the fourth embodiment. The counting unit 15 in the first embodiment includes the period-by-period counting section 21. A counting unit 15 in the fourth embodiment includes a keyword non-containing document counting section 23 in place of the period-by-period counting section 21. The keyword containing document counting section 22 has a function of counting the number of search keyword containing documents as in the first to third embodiments. On the other hand, the keyword non-containing document counting section 23 has a function of counting the number of documents not including the search keyword. The documents not containing the search keyword will hereinafter be referred to as keyword non-containing documents.

Figure 22:
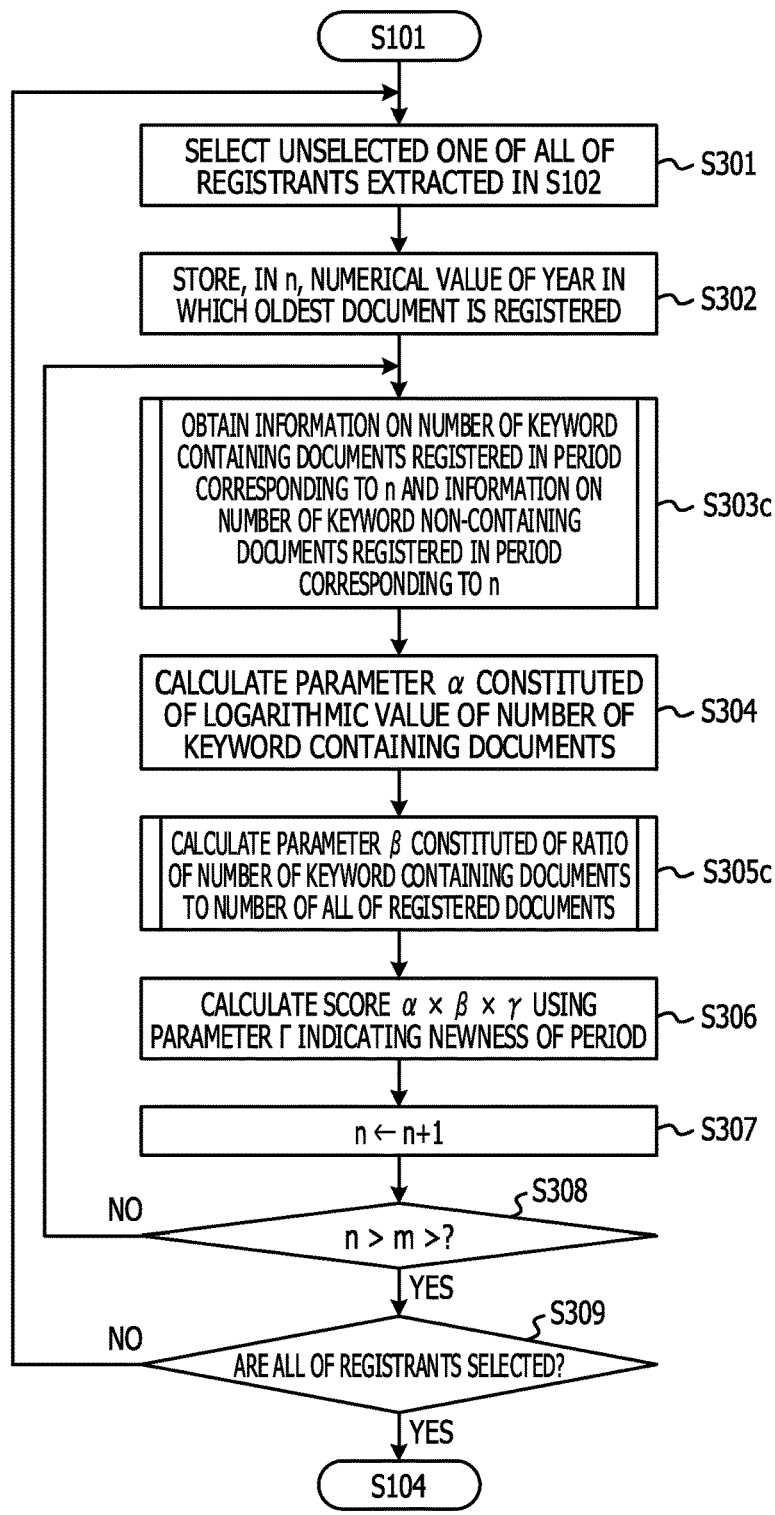
FIG. 22 is a flowchart illustrating an example of an expert search method by an expert search apparatus in the fourth embodiment.

FIG. 22 is a flowchart illustrating an example of an expert search method by an expert search apparatus in the fourth embodiment. FIG. 22 is a modification of the processing contents of S103 illustrated in FIG. 7. The respective pieces of processing of S101 and S102 performed before the processing of the modification of S103 are similar to the respective pieces of processing of S101 and S102 of the first embodiment, and therefore description thereof will be omitted. The respective pieces of processing of S301 and S302 are also similar to the respective pieces of processing of S301 and S302 of the first embodiment, and therefore description thereof will be omitted.

After the processing of S302, the keyword containing document counting section 22 and the keyword non-containing document counting section 23 obtain information on the number of keyword containing documents registered in the period corresponding to n and information on the number of keyword non-containing documents registered in the period corresponding to n (S303c), respectively. The processing of S303c will be concretely described in the following.

Figure 23:
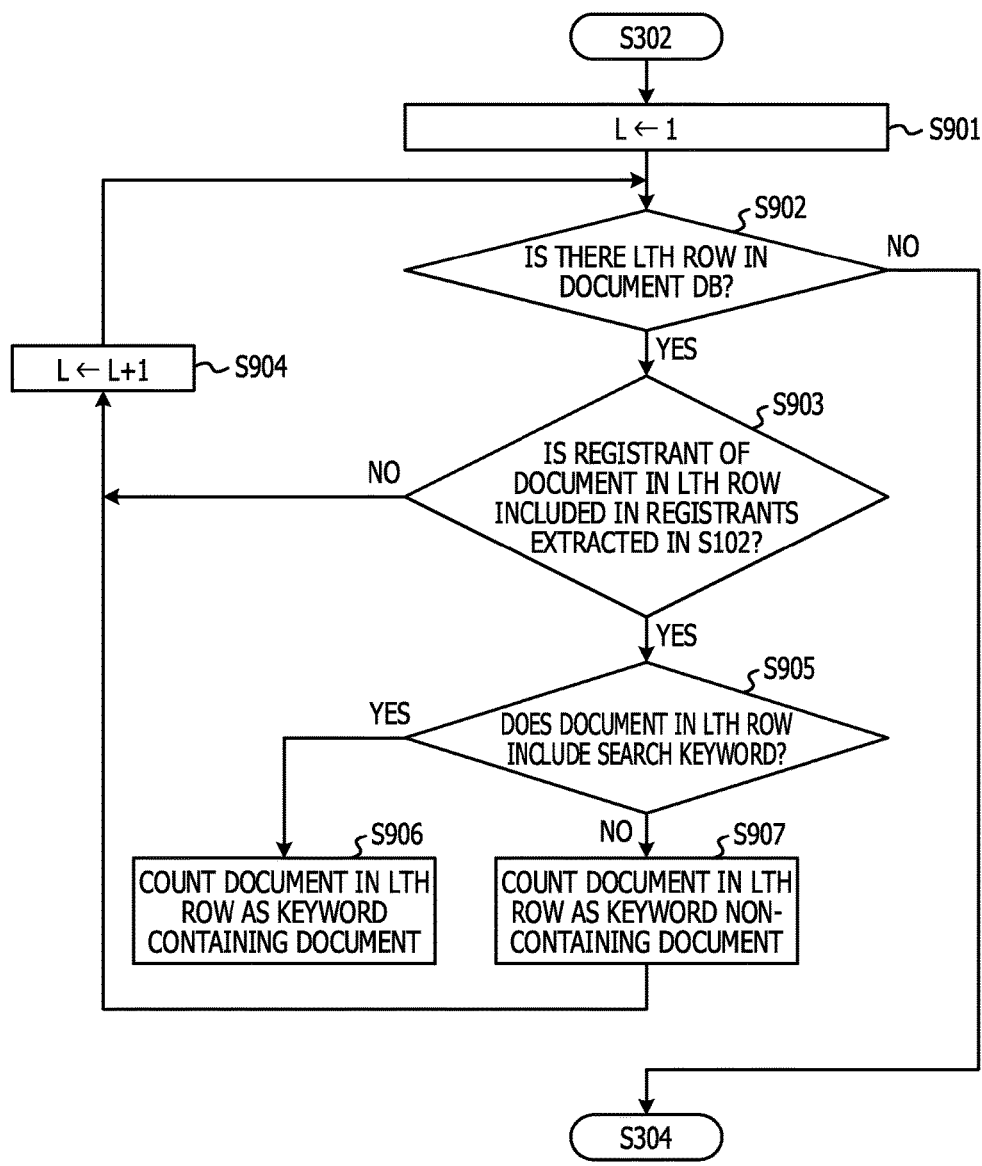
FIG. 23 is a flowchart illustrating an example of processing of obtaining information on a number of keyword containing documents and information on a number of keyword non-containing documents in S303c.

FIG. 23 is a flowchart illustrating an example of the processing of obtaining the information on the number of keyword containing documents and the information on the number of keyword non-containing documents in S303c.

In S303c, first, a search unit 14 initializes the value of L, and stores 1 in L, to search from the first row of a document DB (S901).

Next, the search unit 14 searches the document DB to determine whether or not there is an Lth row in the document DB (S902). When there is an Lth row in the document DB (affirmative in S902), the search unit 14 refers to a document registered in the Lth row of the document DB, and determines whether or not the registrant of the document in the Lth row is included in the registrants extracted in S102 (S903).

When the registrant of the document in the Lth row is not included in the registrants extracted in S102 (negative in S903), the search unit 14 increments the value of L, and thereby sets a value obtained by adding 1 to L as a new value of L, to search for a next row in the document DB (S904). The search unit 14 thereafter returns to S902 to perform the processing from S902 on down again. When the registrant of the document in the Lth row is included in the registrants extracted in S102 (affirmative in S903), on the other hand, the search unit 14 determines whether or not the document in the Lth row includes the search keyword (S905).

When the document in the Lth row includes the search keyword (affirmative in S905), the keyword containing document counting section 22 counts the document in the Lth row as a keyword containing document (S906). After the processing of S906, the search unit 14 performs the processing in S904 of incrementing the value of L, and thereafter returns to S902 to perform the processing from S902 on down again. When the document in the Lth row does not include the search keyword (negative in S905), on the other hand, the keyword non-containing document counting section 23 counts the document in the Lth row as a keyword non-containing document (S907). The search unit 14 then performs the processing in S904 of incrementing the value of L, and thereafter returns to S902. The search unit 14 then performs the processing from S902 on down again to refer to a new Lth row in the document DB.

When processing for all rows of the document DB is eventually ended, it is determined in S902 that there is no Lth row in the document DB (negative in S902), and the processing proceeds to S304. The processing of S303c is thereby completed.

The processing performed in S304 is similar to the processing of the first embodiment, and therefore description thereof will be omitted. After the processing of S304, a score calculating unit 16 calculates a parameter β constituted of the ratio of the number of keyword containing documents to the number of all of the registered documents (S305c). A method of calculating the parameter β in the fourth embodiment will be described in the following.

Figure 24:
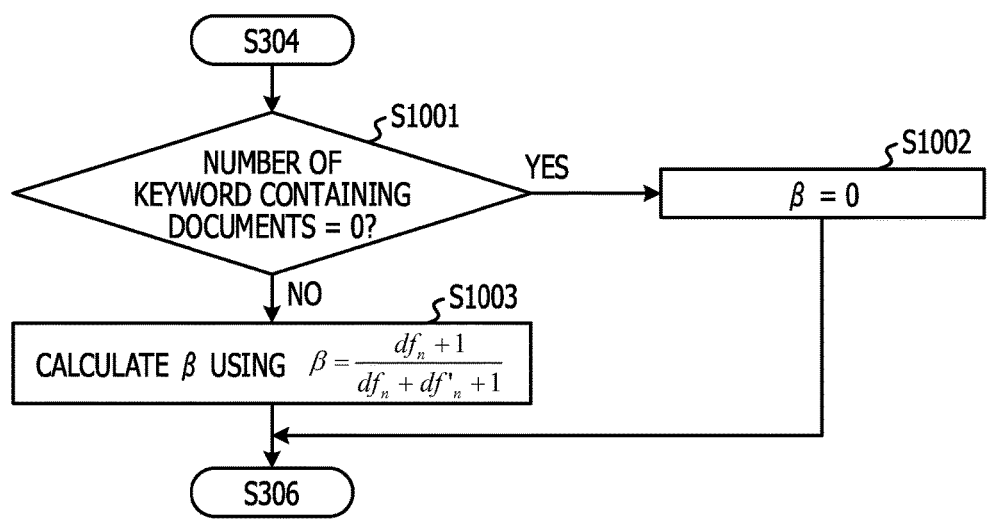
FIG. 24 is an example of a flowchart illustrating a method of calculating a parameter β in S305c.

FIG. 24 is an example of a flowchart illustrating the method of calculating the parameter β in S305c. In S305c, the keyword containing document counting section 22 first determines whether or not the value of the number of keyword containing documents which value is obtained in S303c is 0 (S1001). When the value of the number of keyword containing documents is 0 (affirmative in S1001), the value of β in the period in question is set to be β=0. When the value of the number of keyword containing documents is not 0 (negative in S1001), on the other hand, the score calculating unit 16 calculates the parameter β in the period whose period ID is n using the following Equation (6), for example (S1003).

$$\beta = \frac{df_n + 1}{df_n + df'_n + 1}$$ Equation (6)

$df_n$ : the number of keyword containing documents in the period of $n$ $df'_n$ : the number of keyword non-containing documents in the period of $n$ For example, when the number of keyword containing documents in the period of n is four, and the number of keyword non-containing documents in the period of n is five, β=0.5 can be calculated by assigning 4 to $df_n$ and assigning 5 to $df'_n$ in Equation (6).

The processing of S305c is performed as described above. Each piece of processing from S306 on down which processing follows S305c is similar to each piece of processing from S306 on down which processing is described in the first embodiment, and therefore description thereof will be omitted.

Preferred embodiments of the present technology have been described above in detail. However, the present technology is not limited to particular embodiments, but is susceptible of various modifications and changes. For example, in the foregoing embodiments, the items of registrants are provided in the document DB, and description is made supposing that the registrants are identical with persons responsible for the documents. Alternatively, items indicating information on responsible persons including the writers of documents can be provided in the document DB in place of the items of registrants, or by making an addition, and the processing of searching for experts can be performed on the responsible persons. According to this method, persons having expertise related to the search keyword can be extracted even in a case where registrants are different from persons responsible for the documents.

For example, the equations used for calculating the parameters α, β, and γ are not limited to Equations (1) to (3), but can be modified. In the description thus far of the embodiments, description has been made of an example in which the value of the parameter γ set for each period is stored in the second storage unit 12 in advance. Alternatively, the value of the parameter γ may be calculated each time the processing of calculating an expert value is performed.

Figure 25:
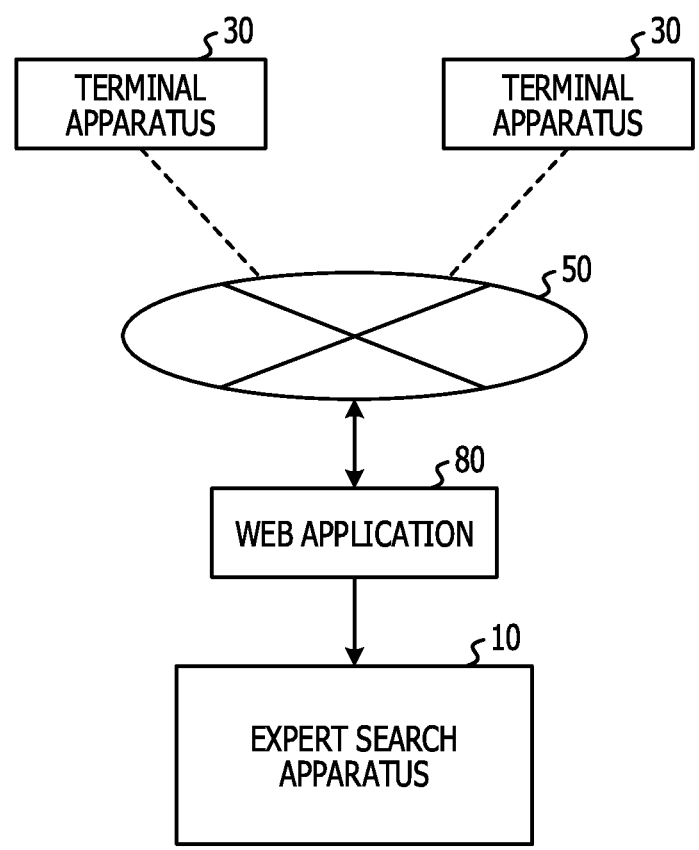
FIG. 25 is a diagram illustrating an example of an expert search service using a Web application.

An expert search by the expert search apparatus 10 can be made by using a Web application. FIG. 25 is a diagram illustrating an example of an expert search service using the Web application. As illustrated in FIG. 25, an expert search apparatus 10 provides users possessing terminal apparatuses 30 with software for searching for experts in the form of a Web application 80. Then, the users can make an expert search by the expert search apparatus 10 by using the Web application 80 via a network 50 such as the Internet or the like.

The above-described expert search apparatus, a computer program for making a computer perform the expert search method, and a computer readable recording medium on which the program is recorded are included in the scope of the present technology. Here, the computer readable recording medium is for example a flexible disk, a hard disk, a compact disc-read only memory (CD-ROM), a magneto-optical (MO) disk, a digital versatile disc (DVD), a DVD-read only memory (DVD-ROM), a DVD-random access memory (DVD-RAM), a blue-ray disc (BD), or a semiconductor memory. The computer program is not limited to the computer program recorded on the recording medium, but may be transmitted via a telecommunication line, a wireless or wire communication line, a network typified by the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method executed by a terminal device and an information processing apparatus coupled to the terminal device, the information processing method comprising:
   acquiring, by the terminal device, a keyword inputted by a user;
   transmitting the acquired keyword to the information processing apparatus;
   receiving, by the information processing apparatus, the keyword from the terminal device;
   extracting one or more documents including the keyword from among a plurality of documents registered in a document database within a period of time including a plurality of periods, the document database being a database in which a registrant who has registered a document in the document database, and a registration date of the document are associated with each other for each of the plurality of documents;
   extracting one or more registrants who have registered the one or more documents from the document database;
   determining, for each of the one or more registrants, an index indicating a registration number of the one or more documents in each period, and a ratio of a number of the one or more documents to a number of all registered documents included in the document database in each period, based on the document database;
   determining, for each of the one or more registrants, a score in each period based on a multiplication result of the determined index, the determined ratio, and a coefficient increased in value as the period becomes newer;
   determining, for each of the one or more registrants, an expert value related to the keyword by adding together the score in each period;
   ranking each of the one or more registrants based on comparison of the determined expert value;
   transmitting a result of the ranking to the terminal device; and
   displaying, by the terminal device, the result of the ranking on a screen of the terminal device, a display range of the screen being narrower than a display range corresponding to all of the result of ranking,
   wherein the determining of the score includes determining a score in a given period by multiplying together a first parameter constituted of a logarithmic value of the number of the one or more documents, a second parameter constituted of a ratio of the number of the one or more documents to the number of all registered documents, and a third parameter indicating a newness of a period, the third parameter being set for each of the plurality of periods.

2. The information processing method according to claim 1,
   wherein the determining of the score includes determining that the second parameter corresponding to the given period is 0 when the number of documents registered in the given period and related to the keyword is zero.

3. The information processing method according to claim 1, further comprising
   sorting the one or more registrants based on the one or more determined expert values.

4. The information processing method according to claim 1, further comprising:
   counting, for each of the periods, a number of documents in which the keyword appears a number of times, the number of times being equal to or more than a given threshold value, among the documents including the keyword.

5. The information processing method according to claim 1, further comprising
   receiving classification information indicating a classification of a search object person,
   wherein the extracting includes extracting one or more experts falling under the classification of the search object person among the one or more registrants based on the classification information.

6. The information processing method according to claim 1, further comprising:
   counting, for each of the periods, a number of registered documents including the keyword with respect to each of the one or more registrants;
   counting, for each of the periods, a number of registered documents not including the keyword with respect to each of the one or more registrants; and
   determining the ratio based on the number of registered documents including the keyword and the number of registered documents not including the keyword.

7. An information processing apparatus comprising:
   a memory; and
   a processor coupled to the memory and configured to:
   receive a keyword from a terminal device,
   extract one or more documents including the keyword from among a plurality of documents registered in a document database within a period of time including a plurality of periods, the document database being a database in which an identifier for identifying a document, a registrant who registered the document in the document database, a registration date, and a title of the document are associated with each other for each of the plurality of documents, extract one or more registrants who have registered the one or more documents from the document database, determine, for each of the one or more registrants, an index indicating a registration number of the one or more documents in each period, and a ratio of a number of the one or more documents to a number of all registered documents included in the document database in each period, based on the document database;, determine, for each of the one or more registrants, a score in each period based on a multiplication result of the determined index, the determined ratio, and a coefficient increased in value as the period becomes newer;

determine, for each of the one or more registrants, an expert value related to the keyword by adding together the score in each period, rank each of the one or more registrants based on comparison of the determined expert value, and transmit a result of the ranking to the terminal device, wherein the processor is configured to determine a score in a given period by multiplying together a first parameter constituted of a logarithmic value of the number of the one or more documents, a second parameter constituted of a ratio of the number of the one or more documents to the number of all registered documents, and a third parameter indicating a newness of a period, the third parameter being set for each of the plurality of periods, and the terminal apparatus is configured to display the result of the ranking on a screen of the terminal device, a display range of the screen being narrower than a display range corresponding to all of the result of ranking.

8. A non-transitory computer-readable storage medium storing a program that causes one or more processors included in a computer to execute a process, the process comprising:

receiving a keyword from a terminal device;

extracting one or more documents including the keyword from among a plurality of documents registered in a document database within a period of time including a plurality of periods, the document database being a database in which an identifier for identifying a document, a registrant who registered the document in the document database, a registration date, and a title of the document are associated with each other for each of the plurality of documents;

extracting one or more registrants who have registered the one or more documents from the document database;

determining, for each of the one or more registrants, an index indicating a registration number of the one or more documents in each period, and a ratio of a number of the one or more documents to a number of all registered documents included in the document database in each period, based on the document database;

determining, for each of the one or more registrants, a score in each period based on a multiplication result of the determined index, the determined ratio, and a coefficient increased in value as the period becomes newer;

determining, for each of the one or more registrants, an expert value related to the keyword by adding together the score in each period;

ranking each of the one or more registrants based on comparison of the determined expert value;

transmitting a result of the ranking to the terminal device; and causing the terminal device to display the result of the ranking on a screen of the terminal device, a display range of the screen being narrower than a display range corresponding to all of the result of the ranking, wherein the determining of the score includes determining a score in a given period by multiplying together a first parameter constituted of a logarithmic value of the number of the one or more documents, a second parameter constituted of a ratio of the number of the one or more documents to the number of all registered documents, and a third parameter indicating a newness of a period, the third parameter being set for each of the plurality of periods.

9. The information processing method according to claim 1, wherein the determining the score includes determining, for each of the one or more registrants, the score for each of a plurality of years within the period of time.

10. The information processing method according to claim 9, wherein the coefficient is set for each of the plurality of years.

11. The information processing method according to claim 10, wherein the coefficient is calculated for each of the plurality of years using a logarithm.

* * * * *